Oct. 28, 1958 H. C. SAVINO ET AL 2,857,987

ELEVATOR SYSTEMS HAVING BASEMENT OPERATION

Filed Sept. 6, 1957 11 Sheets-Sheet 1

Oct. 28, 1958 H. C. SAVINO ET AL 2,857,987

ELEVATOR SYSTEMS HAVING BASEMENT OPERATION

Filed Sept. 6, 1957 11 Sheets-Sheet 3

ELEVATOR SYSTEMS HAVING BASEMENT OPERATION

Oct. 28, 1958 H. C. SAVINO ET AL 2,857,987

ELEVATOR SYSTEMS HAVING BASEMENT OPERATION

Filed Sept. 6, 1957 11 Sheets-Sheet 5

ELEVATOR SYSTEMS HAVING BASEMENT OPERATION

Filed Sept. 6, 1957 11 Sheets-Sheet 6

ELEVATOR SYSTEMS HAVING BASEMENT OPERATION

Oct. 28, 1958 H. C. SAVINO ET AL 2,857,987

ELEVATOR SYSTEMS HAVING BASEMENT OPERATION

Filed Sept. 6, 1957 11 Sheets-Sheet 9

ELEVATOR SYSTEMS HAVING BASEMENT OPERATION

Filed Sept. 6, 1957 11 Sheets-Sheet 10

Oct. 28, 1958 H. C. SAVINO ET AL 2,857,987

ELEVATOR SYSTEMS HAVING BASEMENT OPERATION

Filed Sept. 6, 1957 11 Sheets-Sheet 11

2,857,987

ELEVATOR SYSTEMS HAVING BASEMENT OPERATION

Henry C. Savino and William M. Ostrander, Hackensack, N. J., assignors to Westinghouse Electric Corporation, East Pittsburgh, Pa., a corporation of Pennsylvania Application September 6, 1957, Serial No. 682,402

20 Claims. (Cl. 187—29)

This invention relates to elevator systems wherein an elevator car usually operates between predetermined floors and wherein the elevator car may be assigned under certain conditions to serve one or more extension floors, and it has particular relation to an elevator system employing a plurality of elevator cars usually operating to serve predetermined floors located above one or more basement floors but capable of providing service for the basement floor or floors.

Aspects of the invention are applicable to elevator systems employing one or more elevator cars for serving any desired number of principal floors and any desired number of extension floors. However, the invention may be described adequately with reference to an elevator system employing four elevator cars for providing service to a structure having a sub-basement floor, a main-basement floor located above the sub-basement floor, a lower-terminal floor located above the main-basement floor, an upper-terminal floor located above the lower-terminal floor and a plurality of intermediate floors located between the terminal floors. The elevator cars usually operate between the terminal floors. Conveniently, a dispatcher is associated with at least the lower-terminal floor for the purpose of successively selecting elevator cars to be dispatched towards the upper-terminal floor. Although the invention may be applied to elevator systems of the car-attendant type, the invention is particularly desirable for elevator cars designed for operation without car attendants and will be described for the latter type of system.

The elevator cars usually operate between the lower and upper terminal floors or landings. If a passenger within an elevator car capable of serving a basement floor registers a call for the basement floor, such car proceeds to the basement floor. If a prospective passenger at one of the floors desires to proceed to or from a basement floor and several elevator cars are capable of providing the desired service, one of the available elevator cars is selected to provide the desired service.

A system providing basement operation of this general type is disclosed in the patent application of John Suozzo and Henry C. Savino, Serial No. 461,634, filed October 11, 1954, Patent Number 2,795,298. As hereinafter pointed out, the elevator system may be provided with direction signals such as floor lanterns at least at the lower terminal floor for the purpose of indicating the direction in which each of the elevator cars will next leave the floor.

Certain problems are presented by prior art systems capable of providing basement operation. For example consider the case of an elevator car located at the lower terminal floor and set for travel as indicated by an illuminated up floor lantern for the car. Under certain conditions wherein a down button at the lower terminal floor is operated or an up button at a basement floor is operated, the elevator car may be reversed for the purpose of setting the car for travel towards the basement floor.

Consider first the case of two persons entering the elevator car at the lower terminal floor while it is set for up travel. It will be assumed that a first one of the persons is desirous of proceeding to the third floor whereas a second one of the persons desires to proceed to a basement floor. If the second person registers a basement car call before the first person registers his call, the elevator car may be reversed and may proceed to the basement floor with both persons. This is confusing for the reason that the illuminated up floor lantern has indicated to the first person that the elevator car is set for travel in the up direction, and the second person really has entered the elevator car against the instruction of the illuminated up floor lantern.

As a further illustration of an operation which may cause some confusion, let it be assumed that an elevator car is located at the lower terminal floor and that it is set for up travel as indicated by an illuminated up floor lantern. The first person desirous of proceeding to the third floor again enters the elevator car, but before he can register his car call for the third floor a second person located on the lower terminal floor operates the down button for the first floor, or a person located on a basement floor operates an up floor button for the basement floor. Either of these operations results in a reversal of the direction for which the elevator car is set against the wishes of the first person who desires to proceed to the third floor.

A further problem results from the arrival of a loaded down traveling elevator car at the lower terminal floor at a time when a down floor call has been registered at the lower terminal floor. Under such circumstances it has been the practice to maintain the down direction of the elevator car for a predetermined time after its arrival at the lower terminal floor for the purpose of permitting the intending passenger at the lower terminal floor to enter and register a basement car call before the direction of the elevator car can be reversed. The registered basement car call then maintains the down direction of the elevator car. The time allotted for the purpose may be of the order of three seconds.

When the elevator car reaches the lower terminal floor, the numerous passengers which it carries must be discharged and the time required for the discharge of these passengers may be substantially longer than the aforesaid three seconds. Consequently the direction for which the elevator car is set may reverse before the intending passenger at the lower terminal floor can register his basement car call and he even may lose control of the elevator car.

In accordance with the invention an elevator car capable of serving a basement floor is provided with a detector device for the purpose of detecting movement of a person through the doorway of the elevator car. Such a detector device may take the form of a switch operated by a treadle which is positioned to be stepped on by a person as he leaves or enters the elevator car. As a further example, the detector device may take the form of a switch operated by interruption of a light beam extending across the elevator car doorway. Such detector devices are well known in the art and suitable devices will be described in detail below. When a person enters an elevator car located at the lower terminal floor set for travel in the up direction, the operation of the detector device is utilized to maintain the direction of the elevator car for a time sufficient to permit a passenger to register a car call requiring travel of the elevator car in the up direction. With such an arrangement the prior registration of a basement car call within the allotted time will not be effective for carrying the person in the down direction. If the person fails to register a car call within the allotted time, a basement car call may then be registered for the purpose of reversing the direction of the elevator car. During the allotted time, registration of a down floor call at the lower terminal floor or of an up floor call at a basement floor is not effective for reversing the direction for which the elevator car is set.

The detector device also may be employed for providing a time after departure of the last person to leave the elevator car under certain conditions within which the direction of the elevator car cannot be reversed. Thus if a heavily loaded down traveling elevator car reaches the lower terminal floor at a time when a down floor call is registered at the lower terminal floor, each departing passenger operates the detector device to delay the reversal of the elevator car for a substantial time following such departure. Consequently after the last passenger has left the elevator car, a substantial time is available during which an intending passenger at the lower terminal floor who was responsible for the registration of the down floor call may enter the elevator car and register a basement car call.

The detector device additionally may be employed for the purpose of controlling the non-interference time which may be provided for certain or all of the floors served by the elevator cars. Thus if an elevator car stops at a floor intermediate the two terminal floors, it may be automatically restarted following the expiration of a non-interference time which may be of the order of five seconds. However, operation of the detector device may be utilized to permit starting of the elevator car within a much shorter time interval measured from each movement of a passenger through the doorway of an elevator car. Such use of a detector device is set forth in the co-pending Keiper patent application Serial No. 406,706, filed January 28, 1954, which is assigned to the same assignee as the present patent application.

It is therefore an object of the invention to provide an elevator system wherein an elevator car set for travel in one direction preference has its direction maintained for a substantial time following the entry of a passenger into the elevator car.

It is a further object of the invention to provide an elevator system wherein an elevator car set for travel in one direction will have its direction preference maintained for a substantial time measured from the movement of the last of a number of passengers to follow each other through the doorway.

It is an additional object of the invention to provide an elevator system wherein the up preference of an elevator car located at a lower terminal floor is maintained for a substantial time measured from the entry of a person into the elevator car before registration of a basement-serving call can reverse the direction of the elevator car.

It is also an object of the invention to provide an elevator system wherein the down preference of a down traveling elevator car arriving at a lower terminal floor while a floor call requiring travel in the same direction is registered from such terminal floor is maintained for a substantial time measured from the departure of the last of a number of passengers to follow each other out of the elevator car.

It is a still further object of the invention to provide an elevator system incorporating any combination of the foregoing objects alone or in further combination with the provision of equipment for starting an elevator car from a landing at which it is stopped within a time dependent on the movement of the passengers through the doorway of the elevator car.

Other objects of the invention will be apparent from the following description taken in conjunction with the accompanying drawings in which:

Figs. 1A, 2A, 3A, 4A and 6A are horizontally aligned respectively with Figs. 1, 2, 3, 4 and 6, it will be found that corresponding relay windings and relay contacts of the two sets of figures are substantially in horizontal alignment;

Figure 1:
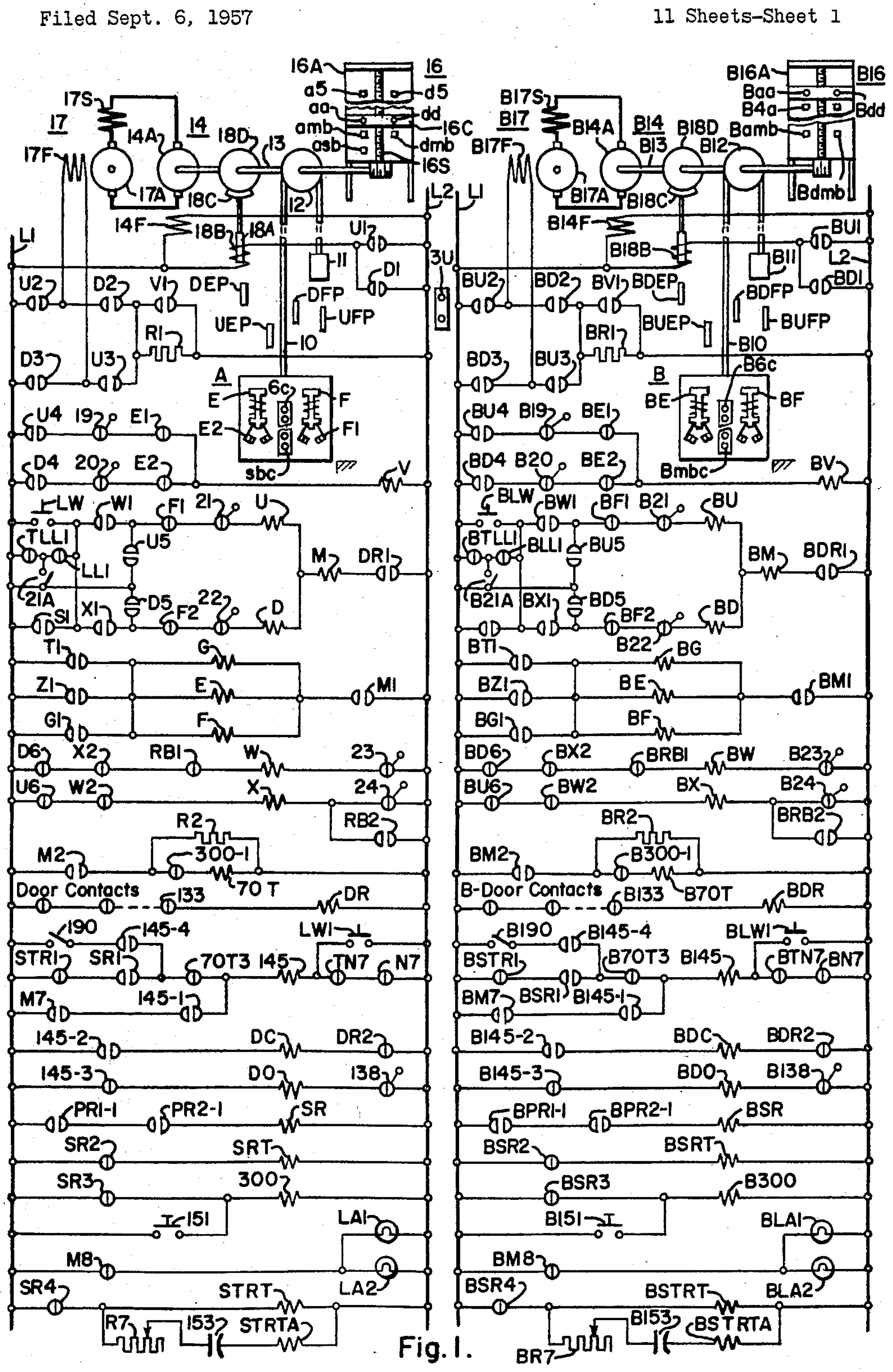
Figures 1, 2, 3, 4 and 6 are schematic views with circuits shown in straight line form of an elevator system embodying the invention.
Figure 1A:
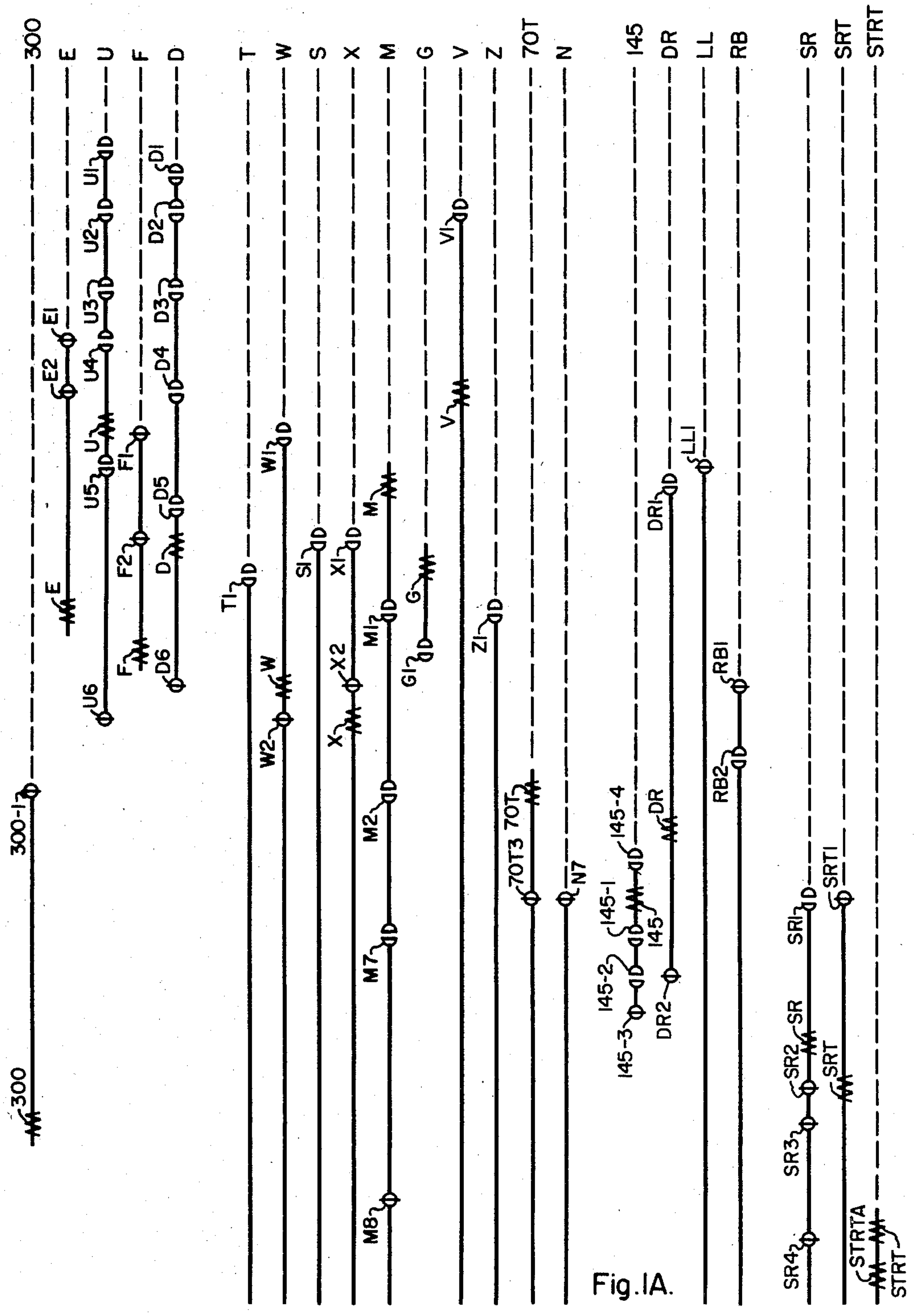
Figs. 1A, 2A, 3A, 4A and 6A are key representations showing relays and switches employed in the elevator system of Figs. 1, 2, 3, 4 and 6. If

In order to facilitate the orderly presentation of the invention, a number of conventions have been adopted. Although the invention may be incorporated in an elevator system having any desired number of elevator cars serving a structure having any desired number of floors or landings, it will be assumed that the invention is incorporated in an elevator system having four elevator cars serving a structure having eight floors or landings including a main-basement landing and a sub-basement landing located below the main-basement landing. The elevator cars are designated by the reference characters A, B, C and D. Inasmuch as the circuits associated with the four elevator cars are largely similar, it will suffice to show primarily the circuits associated with the elevator cars A and B. However, certain components associated with the elevator cars C and D also will be referred to. Distinctions between the circuits for the elevator cars will be pointed out below.

The first landing or street landing or floor is designated a lower-terminal landing and the sixth landing or floor is designated an upper terminal landing. The elevator car A is assumed to be capable of serving all landings whereas the elevator car B is assumed to be capable of serving all landings except the subbasement.

Because of the similarity of the circuits and components associated with the four elevator cars, components associated with the elevator cars B. C and D will be identified by the same reference characters employed for the components associated with the elevator car A preceded by the appropriate letter B, C or D. For example, the relays N, BN, CN and DN are associated respectively with the elevator cars A, B, C and D. The discussion will be directed primarily to the elevator car A and its circuits.

Relays and switches employed for the elevator system may have front or make contacts and back or break contacts. Front or make contacts of a relay are closed when the relay is energized and picked up. The contacts are open when the relay is deenergized and dropped out. Back or break contact of a relay are closed when the relay is deenergized and dropped out. The back or break contacts are open when the relay is energized and picked up.

Each set of contacts of a relay or switch is designated by the reference character employed for the relay or switch followed by a suitable numeral specific to the set of contacts. For example, the reference characters U1 and U3 designate the first and third sets of contacts respectively associated with the up switch U of the elevator car A. In the drawings, all relays are shown deenergized.

In order to further facilitate the presentation of the invention, certain apparatus specific to car A and certain apparatus common to all of the elevator cars are set forth as follows:

*Apparatus specific to elevator car A*

V—Speed relay
U—Up switch
M—Running relay
D—Down switch
G—Inductor hold relay
E—Inductor slowdown relay
F—Inductor stop relay
W—Up preference relay
X—Down preference relay
70T—Non-interference relay
DR—Door relay
H—Car-call relay
T—Car-call stop relay
Z—Floor-call stop relay
LL—Terminal relay
N—Loading relay
S—Start relay
RB—Basement service relay
980S—Service relay
RBZ—Basement zone relay
1CR to 6CR—Car-call registering relays
RBK—Basement running relay
RBT—Basement timing relay
145—Door-control relay
DC—Door-close relay
DO—Door-open relay
SR—Detector relay
SRT—Time delay relay
300—Expediter relay
STRT—Passenger-entering relay

*Apparatus common to all cars*

*mb*DR, 1DR to 6DR—Down-floor-call registering relays
*mb*UR, *sb*UR, 1UR to 5UR—Up-floor-call registering relays
RMZ—Basement master relay
RE—Reset relay
79SS—Availability relay

Figures 1B, 1C:
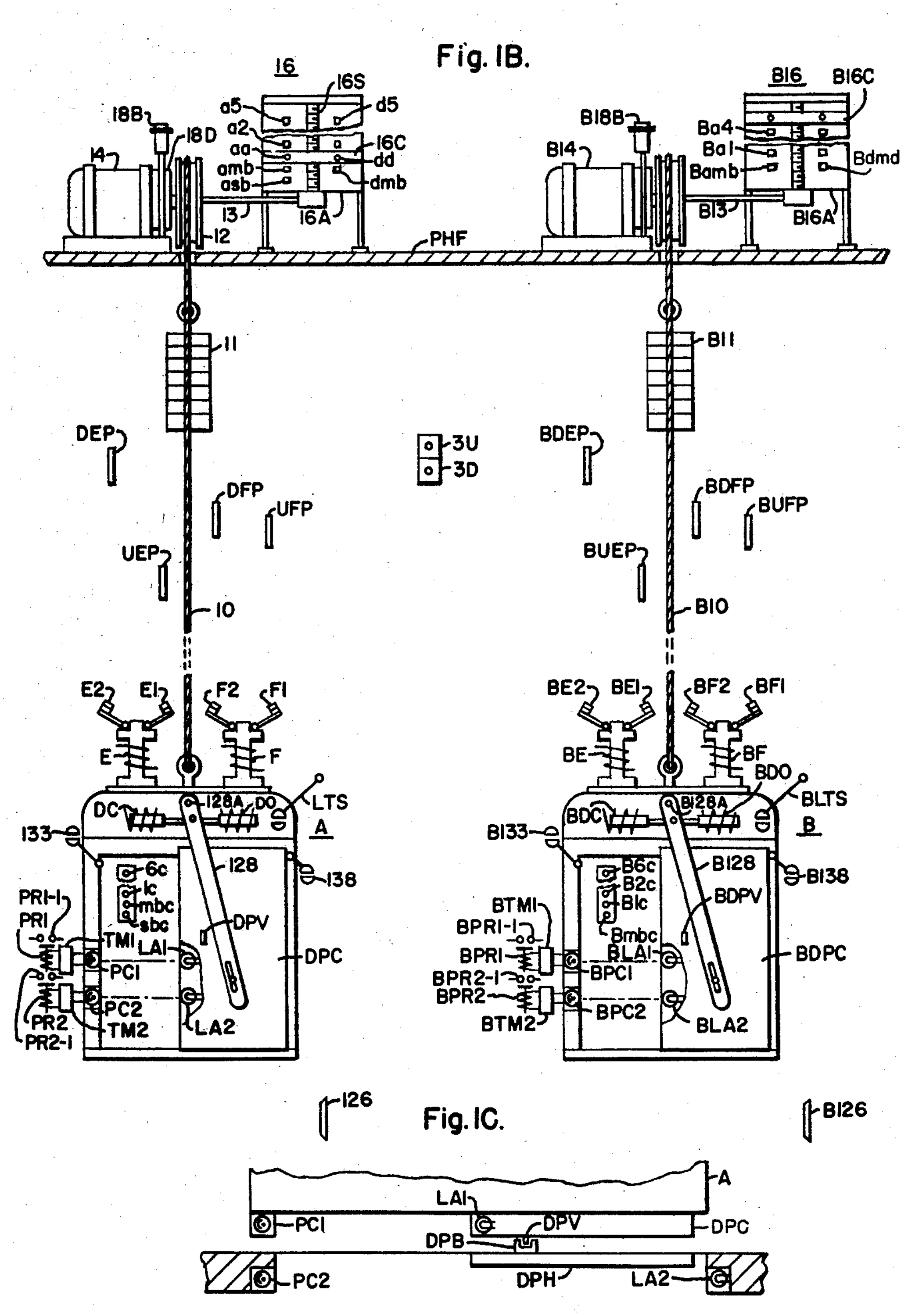
Fig. 1B is a view in front plan with parts broken away of an elevator system embodying the invention.
Fig. 1C is a view in horizontal section showing a portion of an elevator car of Fig. 1B located in a hoistway and Fig. 5 is a schematic view, with parts shown in elevation, of a stepping switch suitable for the system of Figs. 1 to 4.

*Figures 1, 1B and 1C*

Fig. 1 shows the elevator cars A and B and certain control circuits associated therewith. The elevator car A will be assumed to be stopped at the second floor of the structure whereas the elevator car B will be assumed to be stopped at the fifth floor of the structure. With these exceptions, and certain exceptions noted below, the circuits and mechanisms associated with the two elevator cars are similar and will be understood by reference to those associated with the elevator car A. Circuits for the elevator car A are shown in the left-hand column of Fig. 1.

The elevator car A is connected by a rope or cable 10 to a counterweight 11. The rope 10 passes over a sheave 12, which is secured to a shaft 13 for rotation therewith. The shaft 13 is rotated by a motor 14 which may be of any conventional type. For present purposes, it will be assumed that the motor 14 is a direct-current motor having its armature 14A secured to the shaft 13 and having a field winding 14F which is permanently connected across two direct-current buses L1 and L2 which supply direct-current energy for the control circuits.

The elevator car A has therein a plurality of normally-open car-call push buttons *sbc, mbc,* and 1*c* to 6*c* which are actuated for the purpose of registering calls respectively for the subbasement floor, the mainbasement floor and the first to sixth floors as desired by passengers entering the elevator car. The elevator car B does not serve the subbasement and does not have a push button corresponding to push button *sbc*. To permit registration of calls for service by prospective passengers located at the various floors served by the elevator cars, push-button stations are located at such floors. Such a station is shown in Fig. 1 for the third floor. It includes a normally-open up-floor call push button 3U which is pressed by a prospective passenger desiring elevator service in the up direction. A similar push button is located at each floor from which service in the up direction may be desired. The station also includes a normally-open push button 3D which is pressed by a prospective passenger desiring elevator service in the down direction. A similar push button is located at each floor from which elevator service in the down direction may be desired. The numeral of the reference characters (as 3D or 3U) indicates the floor at which the push button is located.

The elevator car A also has mounted thereon a slowdown inductor relay E and a stopping inductor F which may be of conventional construction. The slowdown relay E has two sets of break contacts E1 and E2 associated therewith. The relay has a normally incomplete magnetic circuit and initial energization of the winding of the relay alone does not initially open the associated contacts. However, if the slowdown relay E reaches an inductor plate UEP located in the hoistway of the elevator car while the winding of the relay is energized, the contacts E1 open. The inductor relay may be of the type which when it opens the contacts maintains the contacts open until the relay winding is deenergized even though the relay passes beyond the inductor plate. In Fig. 1, the inductor plate UEP is assumed to be mounted in the hoistway to be reached by the slowdown relay E as the elevator car A nears the third floor. If the elevator car A is to stop at the third floor, the winding of the relay E is energized and when the relay reaches the inductor plate UEP for the third floor, the contacts E1 open to initiate a slowdown operation for the elevator car. It will be understood that a similar inductor plate is similarly associated with each of the floors at which the elevator car A may stop during up travel thereof.

During down travel of the elevator car A, the inductor relay E cooperates with down inductor plates DEP to initiate a slowdown of the elevator car as it approaches a floor at which the elevator car is intended to stop. For example, if the elevator car is to stop during down travel at the third floor, the winding of the inductor relay E is energized as the elevator car nears the third floor. When the inductor relay reaches the down inductor plate DEP for the third floor, the contacts E2 open to initiate a slowdown operation of the elevator car. It will be understood that a similar inductor plate DEP is provided for each of the floors at which the elevator car A is to stop during down travel thereof.

The stopping relay F similarly cooperates with inductor plates UFP and DFP for the purpose of bringing the elevator car to a stop as it reaches a floor at which it is to stop. Thus, if the elevator car A during up travel is to stop at the third floor, the winding of the stopping relay F is energized and as the inductor relay of stopping relay F reaches the stopping inductor plate UFP for the third floor, the contacts F1 open. These contacts in opening result in stopping of the elevator car at the third floor. A similar inductor plate is provided at each of the floors for which the elevator car A is to stop during up travel thereof.

If the elevator car A is to stop at the third floor during down travel thereof, the winding of the stopping relay is energized and as the relay reaches the inductor plate DFP for the third floor, the contacts F2 open to produce a stopping operation of the elevator car at he third floor. It will be understood that a similar inductor plate is provided for each of the floors at which the elevator car A is to stop during down travel thereof.

Because of the large number of control circuits required, it is conventional practice to provide each elevator car with a floor selector 16. This selector includes a plurality of rows of contact segments mounted on the insulating panel 16A. Only two rows of contact segments *asb, amb* and *a*1 to *a*5 and *dmb* and *d*1 to *d*5 are illustrated in Fig. 1. (The elevator car B does not travel to the subbasement floor and does not require contact segments corresponding to contact segments *asb, dmb* and *dsb*.) These contact segments are successively engaged during travel of the elevator car respectively by brushes *aa* and *dd* for the purpose of controlling the energizations of certain circuits. For example, if the elevator car A during down travel is to stop at the third floor in response to a car call, the brush *aa* engages the contact *a*3 shortly before the elevator car A reaches the third floor, to initiate a stopping operation thereof.

The brushes *aa* and *dd* are mounted on a brush carriage 16C which is mounted for movement in accordance with movement of the elevator car, but at a greatly reduced rate. In the embodiment of Fig. 1, it is assumed that the carriage 16C has threaded engagement with a screw 16S which is coupled to the shaft 13 through suitable gearing for rotation in accordance with movement of the elevator A. Consequently, as the elevator car A moves, the brushes mounted on the carriage 16C permit the energization of appropriate circuits at various points of travel of the elevator car.

Although the driving motor 14 may be energized in various ways, it will be assumed that the control of this motor is of the type commonly referred to as a variable voltage control. In such a control, a direct-current generator 17 has its armature 17A connected in a loop with the armature 14A of the motor. A series field winding 17S for the generator also may be included in this loop. The generator has a main field winding 17F which is connected for energization from the direct-current buses L1 and L2 through a reversing switch. This reversing switch includes contacts U2 and U3 of an up switch. When these contacts are closed, the field winding is energized with proper polarity for up travel of the elevator car. On the other hand, when contacts D2 and D3 of a down switch are closed, the field winding is energized with proper polarity for down travel of the elevator car. The energization of the field windings is completed through a resistor R1 for slow speed operation of the elevator car or through make contacts V1 of a speed relay for full speed operation of the elevator car.

The elevator car A is provided with a conventional spring-applied electromagnetically-released brake. This brake includes a brake drum 18D which is secured to the shaft 13 for rotation therewith. A brake shoe 18C normally is biased against the brake drum by means of a spring (not shown). The brake is released upon energization of a brake coil 18D which cooperates with magnetic armature 18A secured to the shoe 18C. The coil 18B is connected to the buses L1 and L2 for energization either through make contacts U1 or through make contacts D1 of the up switch U or the down switch D.

Fig. 1B illustrates the structural relationships of the elevator cars A, B and associated apparatus with reference to the building structure which the elevator cars are intended to serve in greater detail.

The elevator car A also carries a mechanical switch LTS which is positioned to be operated by a cam 126 located in the hoistway associated with the elevator car. The mechanical switch LTS normally is open and is closed by a cam 126 when the elevator car A is adjacent the first or dispatching floor. It will be understood that other mechanical switches may be operated in a similar manner by the elevator car A.

The elevator car A is provided with a door DPC which is mounted to slide across the passage through which passengers enter and leave the elevator car. The door may be moved manually by means of a lever 128 which is pivotally mounted on the car by means of a pivot 128A. In a preferred embodiment of the invention the lever 128 is power-operated to move in a clockwise direction about the pivot by means of a door-close solenoid DC for the purpose of closing the passage and is moved in a counterclockwise movement about its pivot to open the door by means of a door-open solenoid DO.

A suitable detector device is provided for detecting movement of a passenger or load through the elevator doorway. Thus, when the door is open, a signal or energy is projected across the passage through which passengers enter and leave the elevator car. This signal may be of any type which can be modified by the movement of a passenger through the passage and in which the modification produced by such movement may be detected. For example, the signal may be in the form of infrared radiant energy or ultra-violet radiant energy. As a further example, supersonic energy may be projected across the passage. However, it will be assumed in the example shown that the energy is in the form of visible light which is produced by a lamp LA1 mounted on the edge of the door which is the leading edge during a closing movement of the door. The light is in the form of a beam which is focused in any suitable manner on a suitable detector such as a photocell PC1. The output of the photocell may be amplified by means of an amplifier TM1 which is supplied with electrical energy from a suitable source and the output of the amplifier is applied to a relay PR1. The relay PR1 may be designed to be picked up as long as the photocell PC1 receives the beam of radiant energy. Detectors of this type are well known in the art. Examples of such detectors may be found in the Kinnard et al. Patent 1,822,152 and in the Ellis, Jr. Patent 1,947,079.

Although a single beam may suffice, it is generally desirable to employ a plurality of beams. Such beams may be produced by interposing suitable reflectors between the lamp LA1 and the photocell PC1 to reflect a beam across the passage several times before it reaches the photocell. However, for present purposes, it will be assumed that separate lamps and photocells are employed for each of the beams. Thus, in Fig. 1B, a second lamp LA2 is provided for projecting energy towards a photocell PC2 which is associated with an amplifier TM2 and a relay PR2.

In the embodiment thus far described, the lamp LA1 is mounted on one edge of the door DPC. If desired, a lamp and a photocell may be placed in any positions wherein the beam between the lamp and photocell is interrupted by the entry of load into the elevator car or the departure of load from the elevator car. For example, in Fig. 1C, a hoistway door DPH is provided which is coupled to the door DPC for movement therewith when the elevator car is stopped at a floor. It will be understood that a separate hoistway door DPH is provided for each of the floors served by the elevator car. The coupling of the two doors may be effected in a conventional manner as by a vane DPV which is secured to the door DPC for reception in the slot of a slotted block DPB which is mounted on the hoistway door DPH.

The hoistway door DPH is moved to close and expose a hoistway passage through which load enters and leaves the elevator car. As shown in Fig. 1C, the lamp LA2 is mounted on a hoistway wall or door jamb to project radiant energy across the hoistway passage towards the photocell PC2 which also is mounted on a hoistway wall. By inspection of Fig. 1C, it will be observed that the radiant energy transmitted from the lamp LA2 to the photocell PC2 is interrupted each time a passenger enters or leaves the elevator car.

If desired, the edges of the door DPC which is the leading edge during a door-closing movement may be a safety-edge of conventional type. As well known in the art, when such an edge reaches an obstruction, it operates a switch to stop or reopen the door. In the embodiment of the invention now being discussed, it will be assumed that such an edge is not employed.

Returning to Fig. 1, the speed relay V is connected for energization from the buses L1 and L2 through either of two paths. One of these paths includes make contacts U4 of the up switch, a limit switch 19 and the break contacts E1 of the slow-down relay. The limit switch 19 is a cam-operated normally-closed switch which is opened as the elevator car nears its upper limit of travel.

The remaining path of energization comprises the make contacts D4 of the down switch, a limit switch 20 and the break contact E2 of the slow-down relay. The limit switch 20 may be cam operated. It is normally closed and is opened as the elevator car A nears its lower limit of travel.

As long as the elevator car A is running, the running relay M is energized. This relay can be energized only as long as the make contacts DR1 of a door relay DR are closed. These contacts are closed only as long as all of the hoistway doors and car doors for the car A are closed. Such safety provisions are well known in the art.

The running relay M initially can be energized if the break contacts LL1 are closed to indicate that the elevator car is away from the lower terminal floor and if the make contacts DR1 are closed to indicate that all doors associated with the elevator car A are closed. (If a dispatcher is employed at the upper terminal floor, contacts TLL1 similar to the contacts LL1 would be connected in series with the contacts LL1 to open when the elevator car is at the upper terminal floor. For present purposes it is assumed that the contacts TLL1 are shunted by a switch 21A.)

Assuming that the foregoing contacts associated with the running relay M are closed, the relay may be energized initially through either of two paths. One of these paths is as follows:

L1, 21A, LL1, W1, F1, 21, U, M, DR1, L2

Since the up switch U is energized through this path, it follows that the elevator car will be conditioned for up travel. The limit switch 21 is a normally-closed mechanically-operated switch which is opened as the elevator car A nears its upper limit of travel. When energized, the up switch U closes its make contacts U5 to establish a holding circuit around the contacts LL1 and W1 and the switch 21A.

The second path for initially energizing the running relay M may be traced as follows:

L1, 21A, LL1, X1, F2, 22, D, M, DR1, L2

Since the down switch D now is energized, it follows that the elevator car A is conditioned for down travel. The limit switch 22 is a mechanically-operated normally-closed switch which is opened as the elevator car A nears its lower limit of travel. When it picks up, the down switch D closes its make contacts D5 to establish a holding circuit around the contacts LL1 and X1 and the switch 21A.

The starting of the elevator car from the lower-terminal floor (assumed to be the first floor) is controlled by the make contacts S1 which are connected across the contacts TLL1 and LL1. If a dispatcher is employed for the upper-terminal floor, contacts TS1 similar to the contacts S1 may be employed for starting the elevator car from the upper terminal floor. For present purposes, it will be assumed that a dispatcher is employed only for the lower-terminal floor.

If it is desired to expedite departure of the elevator car from a floor when the car is fully loaded, a load-responsive switch LW may be connected across the contacts S1. The switch LW is designed to close only when the elevator car is substantially loaded.

The slowdown relay E, the inductor relay F, and a holding relay G are energized in parallel from the buses L1 and L2 through make contacts M1 of the running relay M. To complete an energizing circuit for these relays E, F and G, one of the following conditions must be present: First, the make contacts T1 are closed to indicate that a car call is registered for a floor which the elevator car A is approaching. Second, the make contacts Z1 are closed to indicate that the elevator car A is conditioned to stop at a floor in answer to a registered floor call for such floor.

When the holding relay G is energized, it closes its make contacts G1 to establish with the make contact M1 a holding circuit for the inductor relays E and F.

The direction of travel of the elevator car A is determined initially by an up-preference relay W and a down-preference relay X. For the up-preference relay W to be energized, the break contacts D6 must be closed (i. e., the down switch D is deenergized). The break contacts X2 must be closed (i. e., the down-preference relay X is deenergized). The limit switch 23 also must be closed. This switch is normally closed and is opened as the elevator car A reaches its upper limit of travel, in this case, the sixth floor. Finally, the break contacts RB1 must be closed to indicate that the elevator car is not assigned for basement service.

The down preference relay X is energized if the break contacts U6 are closed (i. e., the up switch U is deenergized), the break contacts W2 are closed (i. e., the up preference relay is deenergized) and the limit switch 24 is closed. This limit switch is normally closed and is opened as the elevator car A reaches the lower terminal floor. If the elevator car is assigned for basement service, the make contacts RB2 close to shunt the limit switch 24.

As long as the elevator car A is running, the make contacts M2 are closed to energize the non-interference relay 70T. When the elevator car A stops, the contacts M2 open to deenergize the relay. However, the relay 70T has a substantial delay in dropout. This delay may be provided in any suitable manner as by connecting a resistor R2 across the relay coil. The time delay in dropout is selected to be sufficient to permit discharge of passengers from the elevator car A or entry of passengers into the elevator car A after each stop. The delay may be of the order of five seconds. If the break contacts 300–1 open while the relay 70T is picked up, the relay drops out promptly.

It will be recalled that the door relay DR is connected across the buses L1 and L2 through contacts 133 operated by each door associated with the elevator car A. If any of the doors are open, the contacts associated therewith are also open to prevent energization of the door relay DR.

The doors for the elecator car A are controlled by a door-control relay 145. For this relay to be initially energized, the break contacts N7 and TN7 must be closed to indicate that the elevator car is not being loaded at a terminal floor. For present purposes it is assumed that the contacts TN7 for the upper terminal floor are permanently closed. In addition, the break contacts 70T3 must be closed to indicate that the non-interference time has expired. The make contacts SR1 must be closed to indicate that no object is positioned in the closing path of the door. Finally, the break contacts SRT1 must be closed to indicate that an auxiliary or shortened non-interference time has expired. When the relay 145 picks up, it closes make contacts 145–1 to partially complete a holding circuit for the relay. This holding circuit includes the make contacts M7 of the running relay M.

If it is desired to expedite door closure for a loaded car at a terminal floor, a switch LW1 may shunt the contacts N7 and TN7. This switch LW1 and the previously mentioned switch LW are closed only when the elevator car is loaded in excess of say 80% of its rated full-load capacity.

The door-control relay 145 controls the energization of the door-close solenoid DC and the door-open solenoid DO. If the contacts 145–2 of the door-control relay are closed, and the break contacts DR–2 are closed, the solenoid DC is energized. The contacts DR–2 are closed when the door of the elevator car A or an associated hoistway door is away from its closed condition.

If the door-control relay 145 is dropped out, the make contacts 145–3 are closed to complete with the switch 138 an energizing circuit for the door-open solenoid DO. The switch 138 is a limited switch which is normally closed and which is opened as the door reaches its fully-open position.

The detector relay SR is controlled by the make contacts PR1–1 and PR2–1. These contacts are closed respectively as long as the photocells PC1 and PC2 (Fig. 1B) are illuminated by their respective radiant energy beams.

Break contacts SR2 and SR3 of the relay SR respectively control the energization of the time delay relay SRT and the expediter relay 300. The time delay relay SRT may have a time delay in dropout of the order of one-half second.

The expediter relay 300 also may be energized by closure of contacts 151. These contacts may be arranged to close whenever a car call is registered in the elevator car A for the purpose of expediting departure of the elevator car from a floor at which it is stopped. For present purposes it will be assumed that the contacts 151 represent a push button which is located in the elevator car A and which is operated to expedite departure of the elevator car from a floor.

Although the lamps LA1 and LA2 of Fig. 1 may be continuously illuminated, they are illustrated in Fig. 1 as energized through break contacts M8 of the car-running relay M. If the contacts M8 are employed the contacts M2 are arranged to open with sufficient delay to permit prior illumination of the lamps LA1 and LA2, drop out of the relay 300 and energization of the relay 70T.

When the break contacts SR4 close, the passenger-entering relay STRT is energized and the capacitor 153 is charged from the buses L1, L2 through the resistor R7 and the auxiliary coil STRTA. When the contacts SR4 open, the capacitor 153 discharges through the resistor R7, the relay STRT and the auxiliary coil STRTA to maintain the relay STRT picked up for a time which should be sufficient for a passenger to enter the car and register a car call, say about three seconds. The time may be adjusted by adjusting the resistance value of the resistor R7 or the capacitance of the capacitor or both. The coil STRTA is wound over the coil of the relay STRTA in such a direction that the discharge of the capacitor causes each coil to maintain the relay picked up.

Figure 2:
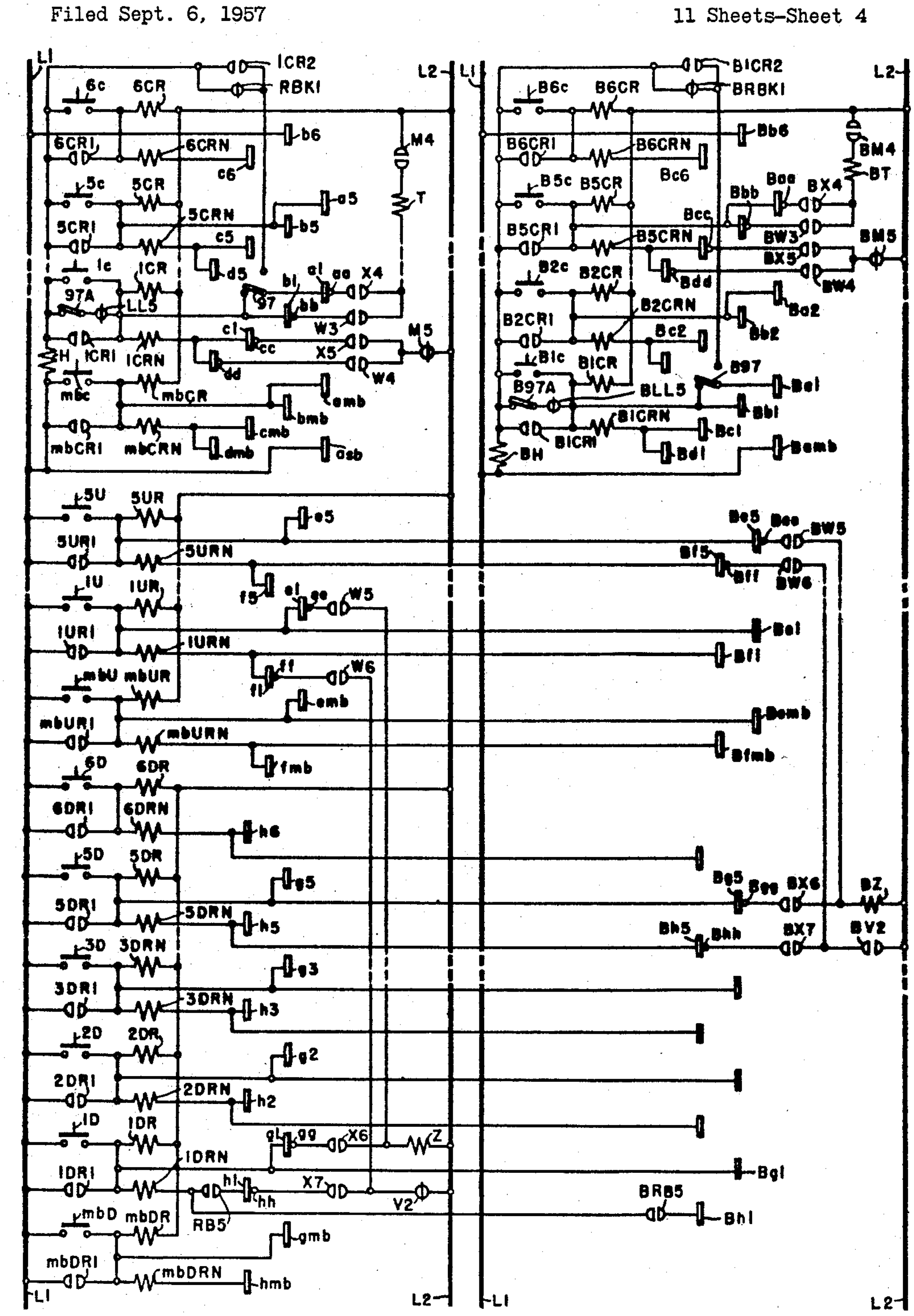

*Figure 2*

Figure 2 shows the call registration circuits for the elevator cars. Car call registration circuits are illustrated for the elevator cars A and B in the upper part of this figure.

Figures 2A, 5:
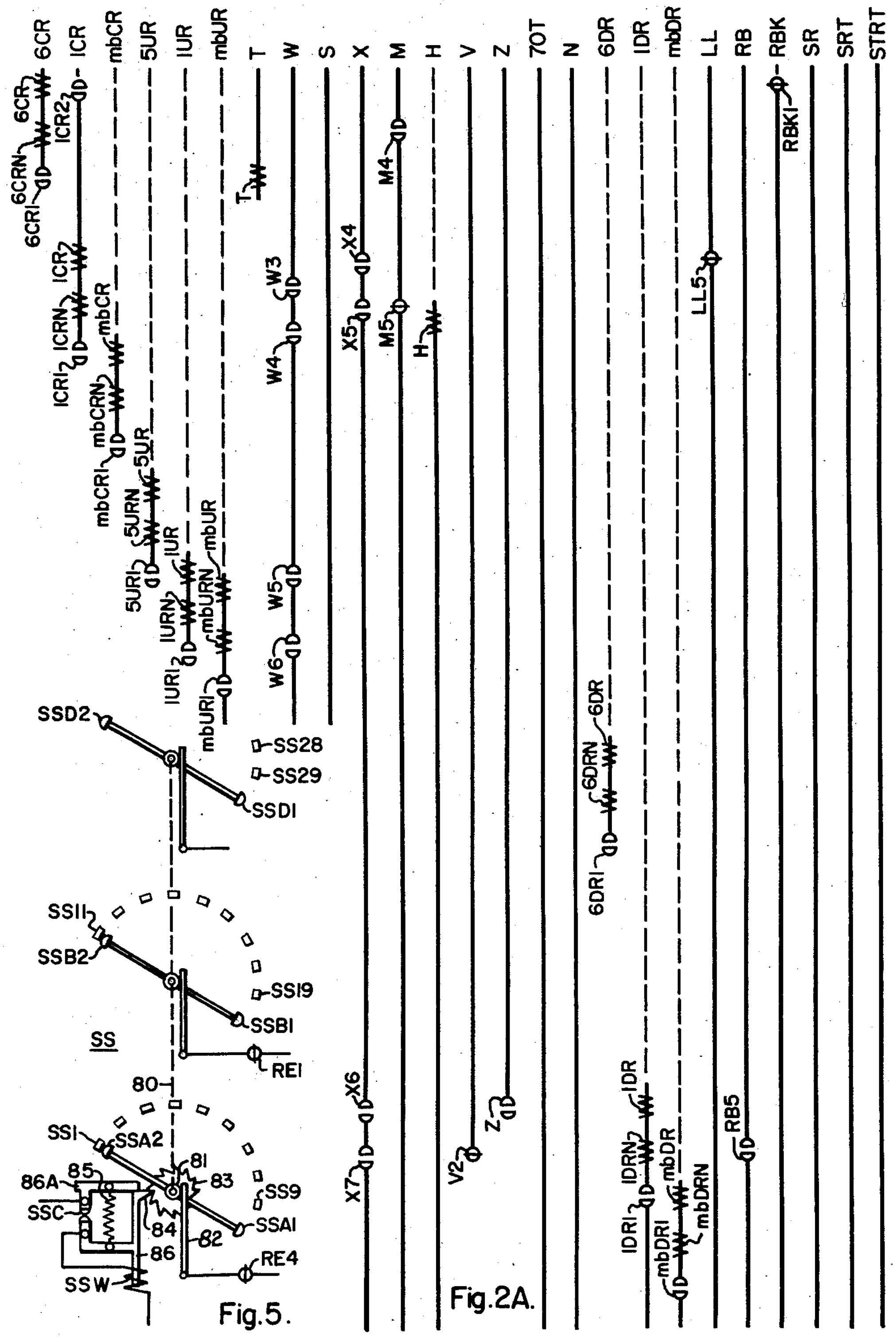
Figure 3:
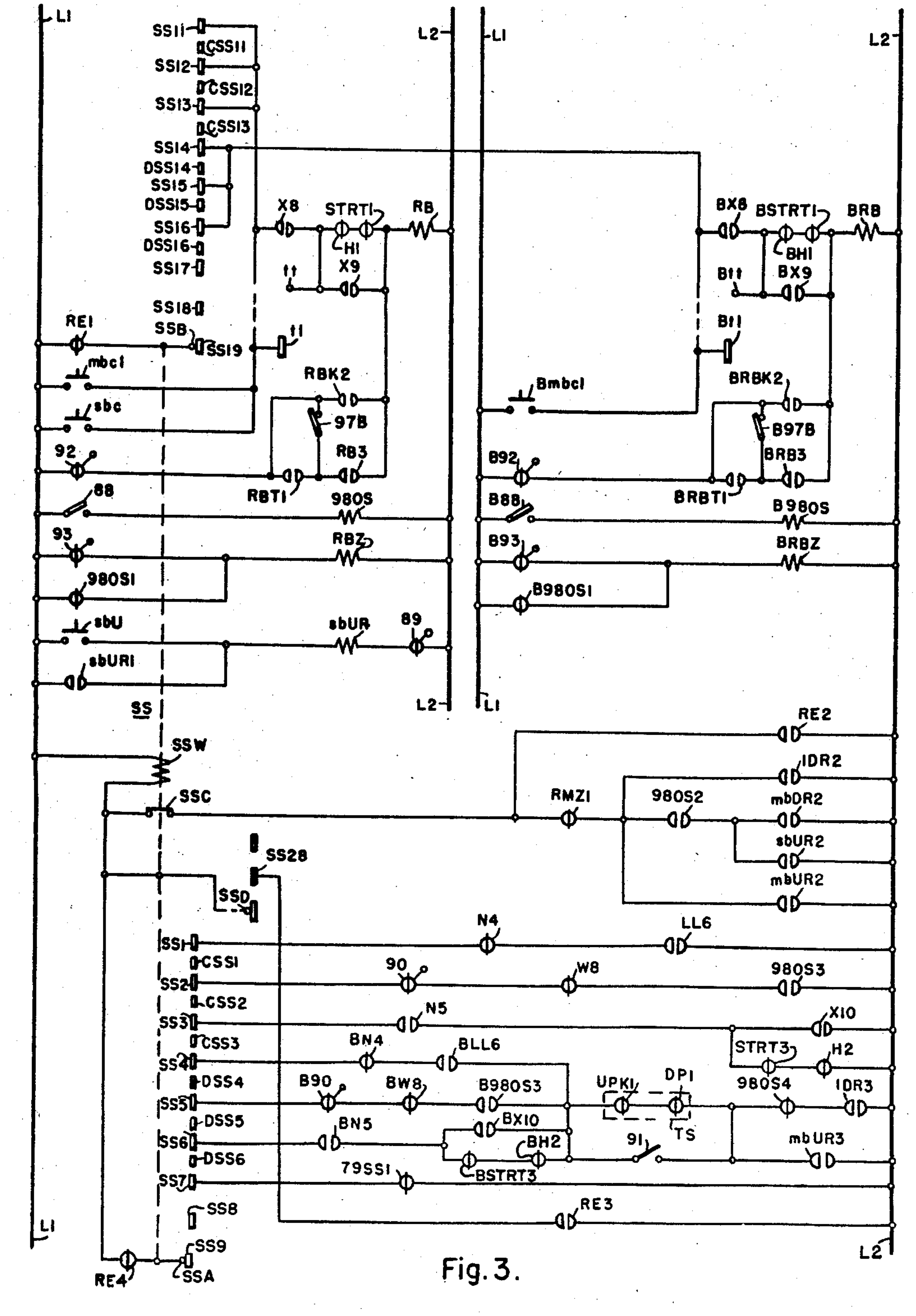
Figure 3A:
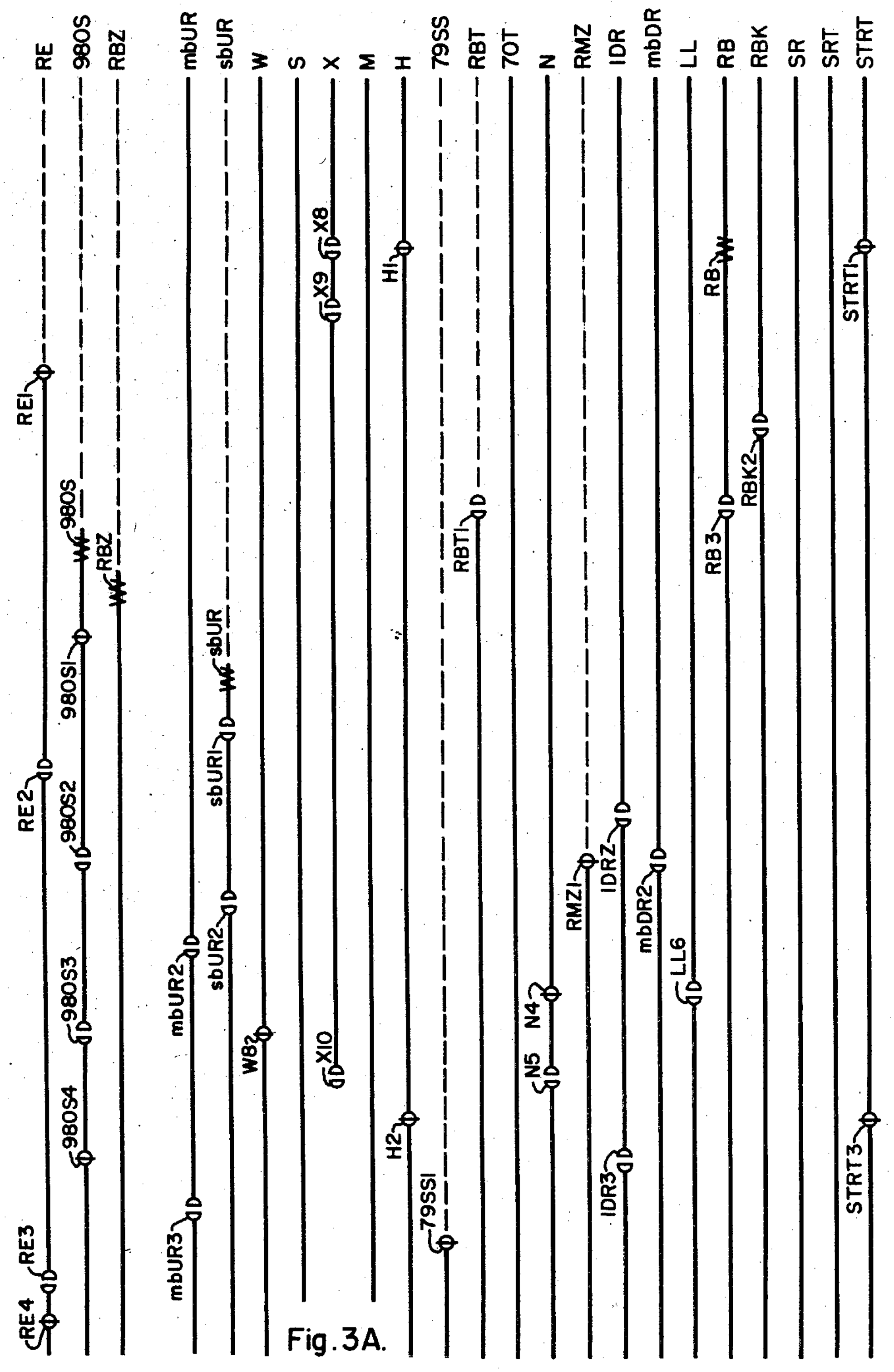

It will be recalled that the elevator car A is provided with a plurality of push buttons *sbc, mbc,* and 1*c* to 6*c* for the purpose of registering car calls. The push button *sbc* is not shown in Fig. 2. (Switches controlled by push buttons in the elevator cars are shown in Fig. 3 for the basement floors for the elevator car A and for the main-basement floor for the elevator car B.) Inasmuch as car call push buttons and associated circuits of the car A for the intermediate floors are similar, they are not illustrated in Fig. 2 for the second, third and fourth floors. Each of these push buttons has associated therewith a car call registering relay *mb*CR and 1CR to 6CR, respectively. In this group only representative relays 6CR and *mb*CR are shown in Fig. 2A. The push buttons and call registration relays cooperate with four rows of contact segments located on the floor selector for the elevator car A. The contact segments *asb, amb* and *a*1 to *a*5 cooperate with the brush *aa* for the purpose of initiating a stopping operation of the elevator car during down travel of the elevator car respectively at subbasement floor, the main-basement floor and the first to fifth floors. The contact segments *bmb* and *b*1 to *b*6 cooperate with a brush *bb* for the purpose of initiating a stopping operation of the elevator car during up travel of the elevator car respectively at the main-basement and first to sixth floors. A brush *cc* cooperates with a row of contact segments *cmb* and *c*1 to *c*6 and a brush *dd* cooperates with a row of contact segments *dmb* and *d*1 to *d*5 for the purpose of cancelling registered car calls as they are answered respectively during down travel and up travel of the elevator car. It will be understood that for each contact segment, the numeral of the reference character designates the floor with which the contact segment is associated. ("*sb*" and "*mb*" designate the sub-basement and the main-basement floors.) Thus, the reference character *a*1 designates the contact segment for the first floor in the *a* row. (As previously explained, the elevator car B does not serve the sub-basement floor and does not have car call circuits for such floor.)

By reference to Fig. 2, it will be observed that when the car call push button 5*c* is pressed, the car call registering relay 5CR is connected therethrough across the buses L1 and L2. This relay closes its make contacts 5CR1 to establish a holding circuit around the push button. The contact segments *a*5 and *b*5 are connected through this set of contacts to the bus L1.

If the elevator car A is set for down travel, the make contacts X4 are closed. And, if the elevator car is approaching the fifth floor, the make contacts M4 of the running relay also are closed. Consequently, as the elevator car nears the fifth floor, the brush *aa* engages the contact segment *a*5 to complete the following circuit for the car call stopping relay T:

L1, H, 5CR1, *a*5, *aa*, X4, T, M4, L2

The energization of the relay T initiates a stopping operation of the elevator car A at the fifth floor.

As the elevator car A continues its approach toward the fifth floor the contact segment *c*5 is engaged by the brush *cc*. As the elevator car comes to a stop, the break contacts M5 of the running relay close to complete the following cancelling circuit:

L1, H, 5CR1, 5CRN, *c*5, *cc*, X5, M5, L2

The operating coil of the registering relay 5CR and the cancelling coil 5CRN are wound in opposition on a common core. Consequently, energization of the cancelling coil 5CRN cancels the effect of the operating coil and resets the registering relay 5CR. Preferably, as the elevator car stops at the fifth floor, the brush *aa* passes slightly below the associated contact segment *a*5, however, the brush *cc* remains in engagement with the associated contact segment *c*5 as long as the elevator car A remains at the floor.

Next, it will be assumed that the same call is registered for the fifth floor as the elevator car A travels up towards the fifth floor. Under these circumstances, the make contacts W3 and W4 of the up preference relay are closed. As the elevator car A nears the fifth floor, the brush *bb* engages the contact segment *b*5 to complete the following circuit:

L1, H, 5CR1, *b*5, *bb*, W3, T, M4, L2

The energization of the car-call stopping relay T results in the initiation of a stopping operation for the fifth floor.

As the elevator car A continues to approach the fifth floor the brush *dd* engages the contact segment *d*5 to complete the following circuit:

L1, H, 5CR1, 5CRN, *d*5, *dd*, W4, M5, L2

The energization of the cancelling coil 5CRN resets the call registering relay 5CR. During the stopping operation, the brush *bb* preferably passes slightly above the associated contact segment *b*5; whereas, the brush *dd* remains in engagement with the associated contact segment *d*5 as long as the elevator car A is at the fifth floor.

The car call registering circuits for all of the intermediate floors are similar to those described for the fifth floor. For this reason and to conserve space, the intermediate floor circuits of the car A are illustrated in Fig. 2 only for the main-basement first and fifth floors. (Corresponding circuits for the car B are shown in Fig. 2 for the first, second and fifth floors.) The elevator car may be stopped at the first floor under all conditions. To this end, break contacts LL5 of the terminal relay are connected across the push button *1c* through a switch 97A, to register a car call for the first floor as soon as the car leaves the first floor.

If the elevator car A is running down toward the lower terminal floor while assigned to the basement area and a stop at the lower terminal floor is unnecessary, the system may be designed to permit the car to pass the lower terminal floor without stopping. To this end, the switch 97A may be opened, and the switch 97 may be moved from the position illustrated wherein the contact segment *a*1 is connected to the bus through contacts 1CR1 to its upper position wherein the contact segment *a*1 is connected to the bus through the parallel make contacts 1CR2 and break contacts RBK1. If the elevator car is to run to the basement area (contacts RBK1 are open) and if no car call is registered for the lower terminal floor (contacts 1CR2 are open), the elevator car will not stop at the lower terminal floor on its down trip.

The car-call registering circuits for the upper terminal (sixth floor) may be similar to those employed for the intermediate floors. However, since the elevator car A stops at the sixth floor only during up travel contact segments for the sixth floor need not be provided in the *a* and *d* rows, and the contacts segment *b*6 may be permanently connected to the bus L1. By reference to Fig. 2, it will be noted that only contact segments *b*6 and *c*6 are provided for the sixth floor.

It is assumed that the elevator car A never proceeds below the subbasement floor. Consequently, a contacts segment *asb* in the "*a*" row is permanently connected to the bus L1 for energizing the relay T as the elevator car nears the subbasement. Contact segments in the *d*, *b* and *c* rows are not required for the subbasement floor. It is assumed further that the elevator car B never proceeds below the main-basement landing, and a contact segment B*amb* is connected permanently to the bus L1 to energize the relay BT as the elevator car B nears the main-basement landing. Contact segments in the B*b*, B*c* and B*d* rows are not required for the main-basement floor. The presence of a registered car call for floors above the basements is detected by the car call relay H through which the relays 1CR to 6CR are energized.

The central part of Fig. 2 illustrates up-floor-calls registering circuits. These circuits are operated by means of normally-open push buttons *mb*U and 1U to 5U common to all of the elevator cars which are located respectively at the main-basement and first to fifth floors. Inasmuch as the push buttons and associated circuits for the intermediate floors are similar, they are not shown for the second, third and fourth floors. The push buttons have associated therewith up-floor-call registering relays *mb*UR and 1UR to 5UR and cancelling coils *mb*URN and 1URN to 5URN in a manner which will be clear from the discussion of the call registering relays and cancelling coils associated with the car call push buttons.

The up-floor-call registering relays *mb*UR and 1UR to 5UR and their cancelling coils may be associated with contact segments for each of the elevator cars in the bank. For example, a row of contact segments *emb* and *e*1 to *e*5, respectively for the main-basement and the first to fifth floors, is provided for the elevator car A and cooperate with a brush *ee*. A brush *ff* cooperates with a row of contact segments *fmb* and *f*1 to *f*5, respectively for the main-basement and the first to fifth floors for the elevator car A.

Let is be assumed that while the elevator car A is traveling up a prospective passenger waiting on the fifth floor presses the up-floor-call push button 5U to energize the up-floor-call registering relay 5UR. This relay closes its make contact 5UR1 to establish a holding circuit around the push button.

Since the elevator car is assumed to be traveling up, the make contacts W5 of the up-preference relay W are closed. As the elevator car A nears the fifth floor, the brush *ee* engages the contact segment *e*5 to complete the following circuit:

L1, 5UR1, *e*5, *ee*, W5, Z, L2

The energization of the floor call stopping relay Z initiates the stop at the fifth floor. In response to movement of the car towards the fifth floor, the brush *ff* engages its contacts segment *f*5. As slow down of the elevator car is initiated, the break contacts V2 close to complete the following circuit:

L1, 5UR1, 5URN, *f*5, *ff*, W6, V2, L2

This resets the up-floor-call registering relay 5UR. As the elevator car A comes to a stop, the brush *ee* preferably passes slightly above the contact segment *e*5. However, the brush *ff* remains in engagement with the contact segment *f*5 as long as the elevator car A remains at the fifth floor. By inspection of Fig. 2, it will be observed that the contact segment *e*5 is connected to the corresponding contact segments for the other elevator cars in the bank (such as contact segment B*e*5 for the elevator car B). Similarly, the contact segment *f*5 is connected to corresponding contact segments (such as the contact segment B*f*5) for the remaining cars of the bank. Consequently, operation of the push button 5U is effective to stop the first up-traveling elevator car which reaches the fifth floor and which is conditioned to accept the call at the fifth floor.

The up-floor-call registering circuits for all of the floors requiring such circuits are similar. Consequently, such circuits are illustrated in Fig. 2 only for the main-basement, first and fifth floors. For this group only relays *mb*UR, 1UR and 5UR are shown in Fig. 2A.

The lower part of Fig. 2 illustrates the down-floor-call registering circuits for the elevator cars. Down floor calls are registered by operation of normally-open push buttons MBD and 1D to 6D for the main-basement and the first to sixth floor, respectively which have associated therewith down-floor-call registering relays MBDR and 1DR to 6DR and cancelling coils MBDRN and 1DRN to 6DRN. Each push button cooperates with its call registering relay and its cancelling coil in the manner discussed with reference to the up-floor-call push buttons. Only relays MBDR, 1DR and 6DR in this group are shown in Fig. 2A.

For the elevator car A, a row of contact segments *gmb* and *g*1 to *g*5 cooperates with a brush *gg* and a row of contact segments *hmb* and *h*1 to *h*6 cooperates with a brush *hh*. Let it be assumed that the elevator car A while traveling down is approaching the fifth floor at which a down floor call has been registered by operation of the push button 5D. Such operation results in energization of the down-floor-call registering relay 5DR to close the make contacts 5DR1. Since the elevator car is traveling down, the make contacts X6 and X7 are closed.

As the elevator car A nears the fifth floor, the brush *gg* engages the contact segment *g*5 to complete the following circuit:

L1, 5DR1, *g*5, *gg*, X6, Z, L2

The energization of the floor call stop relay Z initiates a stopping operation of the elevator car A at the fifth floor. As the elevator car continues its approach, a brush *hh* engages the contact segment *h*5. The initiation of slow down of the elevator car A results in closure of the break contacts V2 to complete the following cancelling circuit:

L1, 5DR1, 5DRN, *h*5, *hh*, X7, V2, L2

The energization of the cancelling coil resets the call-registering relay 5DR. Preferably, as the elevator car A comes to a stop, the brush *gg* passes slightly below the associated contact segment *g*5, but the brush *hh* remains in engagement with the associated contact segment *h*5.

The contact segment *g*5 is connected to corresponding contact segments (such as the contact segment B*g*5) of the remaining cars. Similarly, the contact segment *h*5 is connected to the corresponding contact segments (such as the contact segment B*h*5) for the remaining cars. Consequently, the first elevator car to approach the fifth floor while traveling down will answer a call registered by the call registering relay 5DR.

The down-floor-call registering circuits for all of the intermediate floors are similar and may be traced readily in Fig. 2. (Make contacts RB5 and BRB5 permit cancellation of a call registered by the relay 1DR only if one of the sets of contacts is closed to indicate that one of the elevator cars is conditioned for basement service.) The down-floor-call registering relays for the upper terminal or sixth floor also may be similar. However, since the elevator car A does not stop at the sixth floor during down travel, the contact segment in the *g* row may be omitted for the sixth floor. Also, since the elevator car B does not serve down calls from the main-basement landing, no contact segments corresponding to the contact segments *gmb* and *hmb* are provided for the car B.

*Figures 3 and 5*

In Fig. 3, circuits are illustrated for controlling the basement service relay RB, the service relay 980S, the basement zone relay RBZ and the up-floor-call registering relay *sb*UR for the subbasement floor.

The energization of the basement service relay RB is controlled in part by a stepping switch SS which is common to all of the elevator cars. This stepping switch includes an operating winding SSW and self-stepping contacts SSC which are controlled to advance a brush SSA with respect to a bank of contact segments SS1 to SS9 and a brush SSB with respect to a bank of contact segments SS11 to SS19. Although the principles of stepping switches are well known in the art, it is deemed advisable to illustrate a suitable stepping switch which will be discussed with respect to Fig. 5.

In the embodiment of Fig. 5, the stepping switch SS has the bank of contact segments SS1 to SS9 arranged concentrically in a semi-circle about a shaft 80. Although only one brush SSA is illustrated in Fig. 3, two brushes diametrically opposite each other, SSA1 and SSA2 are secured to the shaft 80 for rotation with the shaft to engage successively the associated contact segments. The shaft also carries a slip ring 81 which is connected to the brushes SSA1 and SSA2. The slip ring is connected through a brush 82 to break contacts RE4. In a similar manner, brushes SSB1 and SSB2 are associated with the contact segments SS11 to SS19. Since the two sets of brushes are mounted on the same shaft 80, it follows that they operate in synchronism at all times.

In order to step the shaft 80 a ratchet wheel 83 is secured to the shaft. This ratchet wheel cooperates with a pawl 84 which is mounted for reciprocation in a vertical direction, as viewed in Fig. 5. The pawl 84 is biased by a spring 85 in an upward direction as viewed in Fig. 5 for the purpose of urging the contacts SSC to their closed condition. When the winding SSW is energized, a magnetic armature 86 associated therewith is lowered relative to a fixed member 86A, as viewed in Fig. 5, for the purpose of opening the contacts SSC and moving the pawl 84 away from the ratchet wheel. When the winding thereafter is deenergized, the spring 85 returns the pawl 84 to the position illustrated in Fig. 5. During such movement of the pawl, the pawl engages the ratchet wheel for the purpose of advancing the shaft 80 one step. During this movement of the pawl, the contacts SSC reclose.

The brushes SSA1 and SSA2 are shown in Fig. 5 one step beyond their reset positions. As the shaft 80 is stepped in a clockwise direction, as viewed in Fig. 5, the brush SSA2 consecutively engages the contact segments until it reaches the contact segment SS9. The next step of the shaft 80 thereafter results in engagement of the contact segments SS1 by the brush SSA1.

A third row of contact segments is associated with a pair of brushes SSD1 and SSD2 which are also operated by the shaft 80. Only one of these contact segments, SS28, is employed in the circuits of Fig. 3.

Returning to Fig. 3, it will be noted that the stepping of the stepping switch is initiated by energizing the winding SSW through the contacts SSC. Such energization can be effected only if the break contacts RMZ1 are closed to indicate that no elevator car is in the basement area. If these break contacts are closed, the winding SSW then can be energized through each of several circuit arms. Thus, if a down floor call for the first floor is registered, the make contacts 1DR2 close to complete with the break contacts RMZ1 an energizing circuit for the winding SSW. Following energization of the winding SSW, the winding cooperates with the self-stepping contacts SSC to step the stepping switch until the winding is either continuously energized or continuously deenergized. In a somewhat similar manner, the winding SSW is energized when ever a demand for elevator service is received requiring movement of an elevator car into the basement area. Thus, if a prospective passenger on the main-basement floor desires elevator service in the up direction, he may operate the floor call registering relay *mb*UR to close the make contacts *mb*UR2. These contacts together with the break contacts RMZ1 complete an energizing stepping circuit for the winding SSW.

A call for elevator service from one of the floors requiring movement of the elevator car to the subbasement floor can be answered only by the elevator car 1. Consequently, if the elevator car A is not in service, the desired service cannot be provided. If the elevator car A is placed in service, the switch 88 is closed to energize the service relay 980S. This relay closes its make contacts 980S2 to render effective two floor-call registering relays. Thus, if a prospective passenger at the main-basement floor desires to proceed in the down direction, he may operate the down push button for his floor to close the make contacts *mb*DR2 of the registering relay *mb*DR. These complete with the contacts 980S2 and RMZ1 an energizing stepping circuit for the winding SSW. In a similar manner, a prospective passenger at the subbasement floor may operate his push button *sb*U to establish with the limit switch 89 an energizing circuit for the up-floor-call registering relay *sb*UR for the subbasement floor. The switch 89 normally is closed and is cam operated to open when the elevator car A reaches the subbasement floor.

In response to its energization, the relay *sb*UR closes its holding contacts *sb*UR1 and its make contacts *sb*UR2. The latter contacts complete with the contacts 980S2 and the break contacts RMZ1 an energizing stepping circuit for the winding SSW. If another of the elevator cars, such as the car C is arranged to serve the subbasement floor, make contacts of its service relay may be connected in parallel with the make contacts 980S2 of the service relay for the elevator car A.

The winding SSW also may be energized for a resetting operation in response to closure of the make contacts RE2 of the reset relay RE.

When a call is registered resulting in energization of the winding SSW, the stepping switch SS starts to step from the reset position illustrated in Fig. 3 for the purpose of assigning an available elevator car to proceed to the basement area. Inasmuch as it is preferred to assign an elevator car capable of serving the subbasement floor, the brush SSA first engages contact segments associated with the elevator car A and continues to step until it reaches a contact segment which maintains the energization of the winding SSW.

In the present case, the three contact segments SS1, SS2, and SS3 are associated with the elevator car A and define three predetermined conditions which permit assignment of the elevator car A to answer a call requiring movement of the elevator car A to the basement area. Thus, if at the time the brush SSA engages the contact segment SS1 the elevator car A is at the lower-terminal floor, the make contacts LL6 are closed. If the elevator car A, at the same time, has not been selected by the dispatcher to leave the lower-terminal floor, the break contacts N4 of the loading relay are closed and the stepping switch SSW is continuously energized to terminate the stepping of the stepping switch. If neither of these conditions is present, the brush SSA next steps to the contact segment SS2.

The engagement of the brush SSA and the contact segment SS2 results in continuous energization of the winding SSW only if the switch 90 is closed to indicate that the elevator car A is displaced from the upper-terminal floor, if the break contacts W8 are closed to indicate that the elevator car A is traveling down and if the make contacts 980S3 are closed to indicate that the elevator car A is in service. The switch 90 is normally closed and is cam operated to open only when the elevator car A is adjacent the upper terminal floor. If none of these conditions is present, the brush SSA steps to the contact segment SS3.

Engagement of the brush SSA and the contact segment SS3 completes an energizing circuit for the winding SSW only if the make contacts N5 are closed to indicate that the elevator car A has been selected by the dispatcher to leave the lower-terminal floor and either the make contacts X10 are closed to indicate that the elevator car A is set for down travel or the break contacts H2 are closed to indicate that no car call has been registered in the elevator car A for a floor above the basement floors, provided that the break contacts STRT3 are closed to indicate that any person entering the elevator car A has had adequate time to register a call for a higher floor. If another of the elevator cars, such as the elevator car C, is capable of serving the subbasement floor, each of the contact segments SS1, SS2 and SS3 may be followed by a corresponding contact segment associated with the elevator car C. Thus, a contact CSS1 may be associated with a circuit for the elevator car C corresponding to the circuit for the elevator car A associated with the contact segment SS1. However, for present purposes, it will be assumed that only the elevator car A is capable of serving the subbasement floor. Consequently, if the elevator car A is not available for assignment to the basement area, the brush SSA next steps into engagement with the contact segment SS4 which is one of a group of three contact segments associated with the elevator car B. Assuming that the switch 91 is closed, the engagement of the brush SSA with the contact segment SS4 completes a circuit for the winding SSW if the elevator car B is at the lower-terminal floor (make contacts BLL6 are closed) if the elevator car B has not been selected by the dispatcher to leave the lower-terminal floor (break contacts BN4 are closed) and a call for elevator service has been registered by a prospective passenger at the main-basement floor (make contacts *mb*UR3 are closed). Instead of being completed through the contacts *mb*UR3, the circuit also may be completed if the elevator car A is not in service (break contacts 980S4 are closed) and a call for down elevator service has been registered by a prospective passenger at the first floor (make contacts 1DR3 are closed). If the required conditions are not present, the brush SSA steps to the next contact segment SS5.

Engagement of the contact segment SS5 by the brush SSA completes an energizing circuit for the winding SSW if the elevator car B is displaced from the upper terminal floor (switch B90 is closed). The elevator car B is proceeding down (break contacts BW8 are closed). The elevator car B is in service (contacts B980S3 are closed), and in addition, the previously discussed contacts *mb*UR3 are closed or the contacts 980S4 and 1DR3 are closed. If the required conditions still are not present, the brush SSA steps into engagement with the contact segment SS6.

Engagement of the contact segment SS6 by the brush SSA completes an energizing circuit for the winding circuit if the elevator car B has been selected by the dispatcher to leave the lower-terminal floor (make contacts BN5 are closed) and the elevator car B is proceeding down (make contacts BX10 are closed) or the elevator car has no registered car call for a floor above the basement floors and the allotted time for such registration has expired (break contacts BH2 and BSTRT3 are closed). In addition, the circuit must be completed through one of the previously discussed paths including the contacts *mb*UR3, 980S4 and 1DR3. Finally, if the elevator car B is not available for assignment to the basement area, the brush SSA steps into engagement with the contact segment SS7 and is energized through the break contacts 79SS1. The brush remains in this position until the contacts 79SS1 open to indicate that an elevator car is available for assignment for basement service whereupon the cycle is repeated.

If another elevator car such as the elevator car D is available for assignment to serve only the main-basement of the basement floors, contact segments DSS4, DSS5, and DSS6 may be located below the corresponding contacts for the elevator car B. These contacts are associated with circuits for the elevator car D which are similar to the circuits associated with the contact segments SS4, SS5 and SS6 for the elevator car B. However, for present purposes, it will be assumed that only the elevator car B is available for such service.

Under certain conditions it may be desirable to modify the performance of the elevator system in response to a demand for basement service. For example, during peak periods it may be advisable to decrease the number of elevator cars which may respond to a call for elevator service from one of the floors of the structure. Such a peak period may be an up-peak period wherein large numbers of prospective passengers desire to be carried from the lower terminal floor to a higher floor of the structure. As a further example, the peak period may be a down-peak period during which many passengers desire to be carried from higher floors of the structure to the lower terminal floor. Modifications of an elevator system for the purpose of expediting travel in one direction during peak periods are well known. For example, during such a period, the floors of the structure may be divided into zones with certain cars designated high-zone cars assigned to serve primarily a high zone of floors and certain elevator cars designated low-zone cars to serve a low zone of floors. As a further example, during an up-peak period the floor-call stop relay of a car may be prevented from responding to down floor calls. Thus, for the elevator car A the brushes *gg* and *hh* (Fig. 2) may be disconnected from the floor-call stop relay Z. During a down-peak period certain or all of the cars may be prevented from responding to up floor calls. Thus, the elevator car A may have its brushes *ee* and *ff* disconnected from the floor call stop relay Z during a down-peak period.

Although the peak periods may be detected by a computer responsive to traffic conditions, for present purposes it will be assumed that the peak periods are determined by a time switch TS (Fig. 3) which opens up-peak contacts UPK1 during periods when an up-peak is expected. The time switch opens contacts DP1 during periods when a down-peak is expected.

If the switch 91 is opened the contact segments SS4, SS5 and SS6 are ineffective for energizing the winding SSW of the stepping switch during an up-peak period when the contacts UPK1 are opened or during the down peak period when the contacts DP1 are opened. Preferably an elevator car capable of serving the subbasement floor is left in service, in this case the elevator car A. If several cars are capable of serving the subbasement and if during a peak period certain of these cars are high-zone cars and certain are low-zone cars, preferably an elevator car left in condition to serve the basement area is one of the high-zone cars.

It will be recalled that the brush SSB moves in unison with the brush SSA. Consequently, when the stepping switch moves from its reset condition, the brush SSB successively engages the contact segments SS11, SS12 and SS13, all of which are associated with the elevator car A. These contacts segments are connected in parallel for controlling in part the energization of the basement service relay RB for the elevator car A. The relay RB preferably has a delay in pick-up which is slightly greater than the time required for the brush SSB to step from one contact segment to the next contact segment. Consequently, the relay RB does not pick up during a stepping operation of the brush SSB. The relay can pick up only if the brush stops at a contact segment for a time greater than the time delay of the relay and if certain other conditions are satisfied.

Energization of the basement service relay RB also requires that the elevator car A be set for down travel (make contacts X8 are closed) or that the elevator car A be positioned at the lower terminal floor (brush *tt* is in engagement with the contact segment *t*1). The contact segment *t*1 and its associated brush are mounted on the floor selector of the elevator car A.

Energization of the basement service relay RB further requires that the elevator car A be set for down travel (make contacts X9 are closed) or that no car call is registered in the elevator car A for a floor above the basement area (break contacts H1 are closed) and that a time has elapsed sufficient to permit entry of a passenger into the car and registration of a car call (break contacts STRT1 are closed).

If another elevator car, such as the elevator car C, is connected for operation in the same manner as discussed for the elevator car A, contact segments for the elevator car C may be associated with a relay similar to the relay RB in the same manner discussed for the elevator car A. Such contact segments CSS11, CSS12 and CSS13 are illustrated in Fig. 3 respectively below the contact segments SS11, SS12 and SS13, but for present purposes it will be assumed that they are not employed.

If the elevator car A is not available for assignment for basement service the brush SSB next engages one of three contact segments SS14, SS15 and SS16 which are associated with the basement service relay BRB for the elevator car B in the same manner by which the contact segments SS11, SS12 and SS13 are associated with the relay RB for the elevator car A. If another elevator car, such as the elevator car D is designed for operation in a manner similar to that discussed for the elevator car B, contact segments DSS14, DSS15 and DSS16 may be associated with a basement service relay for the elevator car D in the same manner by which the contact segments SS14, SS15 and SS16 are associated with the relay BRB for the elevator car B. Although the contact segments DSS14, DSS15 and DSS16 are illustrated in Fig. 3 respectively below the contact segments SS14, SS15 and SS16, it will be assumed that they are not employed.

The contact segments SS17, SS18 and SS19 are disconnected segments which merely represent stepping positions for the brush SSB.

If a car call is registered in the elevator car A while the car is set for down travel, it is desirable that the elevator car A be assigned to proceed to the basement floor. Thus, if a car call is registered for the main-basement floor, the push button *mbc* of Fig. 2 is operated. This push button has an additional set of contacts *mbc*1 which are shown in Fig. 3. If the contacts *mbc*1 are closed while the elevator car A is set for down travel the relay RB is connected for energization through the circuit:

L1, *mbc*1, X8, X9, RB, L2

Similar contacts are provided for the elevator car B.

If a car call in the elevator car A is registered for the subbasement floor a push button *sbc* is operated. If the elevator car A is set for down travel the following circuit is established:

L1, *sbc*, X8, X9, RB, L2

Since the elevator car B does not serve the subbasement floor a similar push button is not provided for the elevator car B.

When the basement service relay RB is energized it closes holding contacts RB3 which complete with a switch 92 a holding circuit for the relay. (For the present, switches 97B and B97B are assumed to be closed to shunt respectively the contacts RBT1 and BRBT1.) The switch 92 is normally biased into closed condition and is cam operated to open when the elevator car A is adjacent the subbasement floor. The corresponding switch B92 for the elevator car B is cam operated to open when the elevator car B is adjacent the main basement floor. If the switch 97B is open the holding circuit completed by the contacts RB3 includes make contacts RBT1. Make contacts RBK2 also complete with the switch 92 a holding circuit for the relay RB.

The presence of the elevator car A in the basement area is detected by a basement zone relay RBZ which is energized through a switch 93. The switch is normally biased to closed condition and is cam operated to open when the elevator car A is below the lower-terminal floor. If the elevator car A is out of service the break contacts 980S1 close to maintain the relay RBZ in energized condition.

During a resetting operation of the stepping switch the break contacts RE1 and RE4 are opened to prevent a false stepping of the stepping switch.

Figure 4:
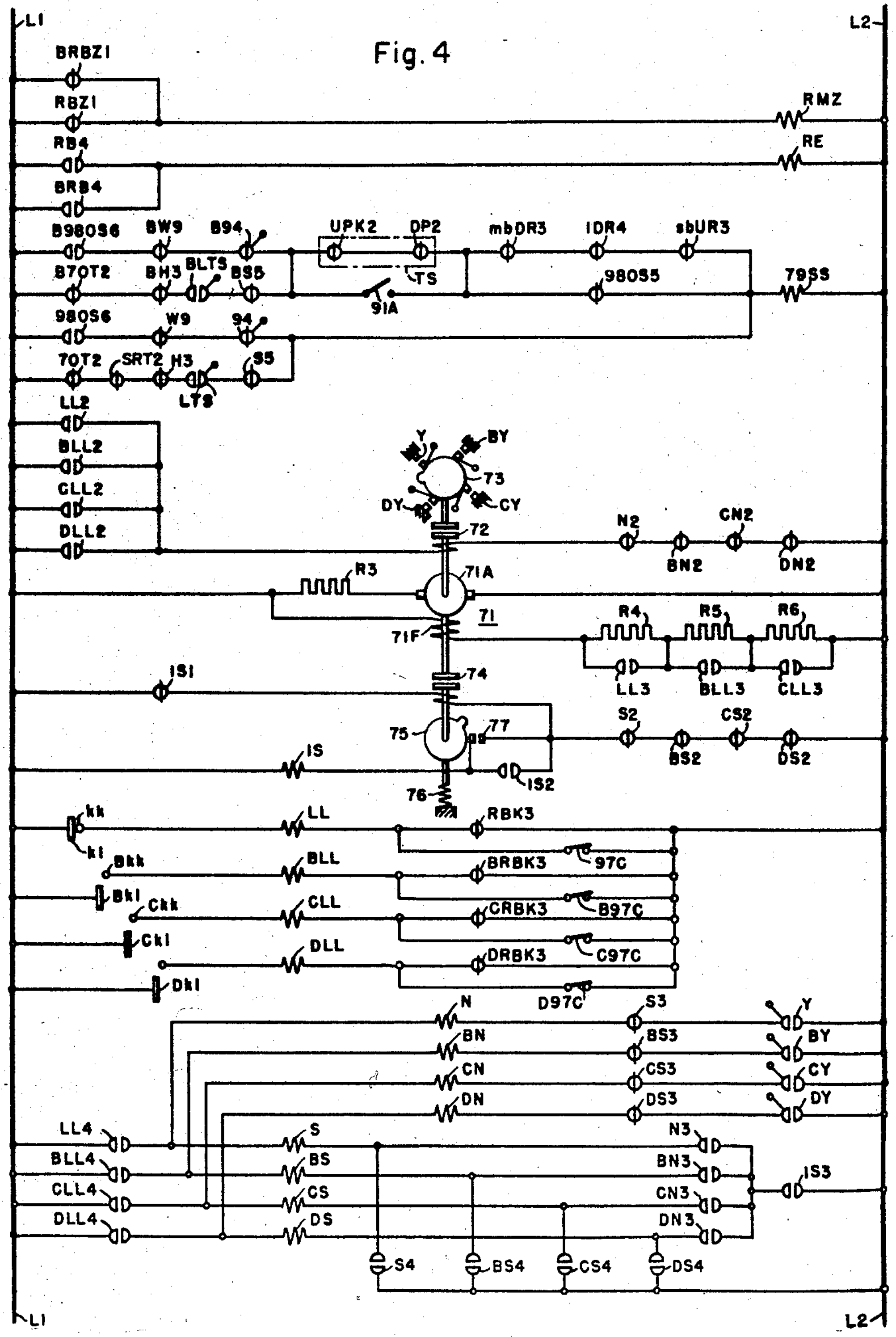
Figure 4A:
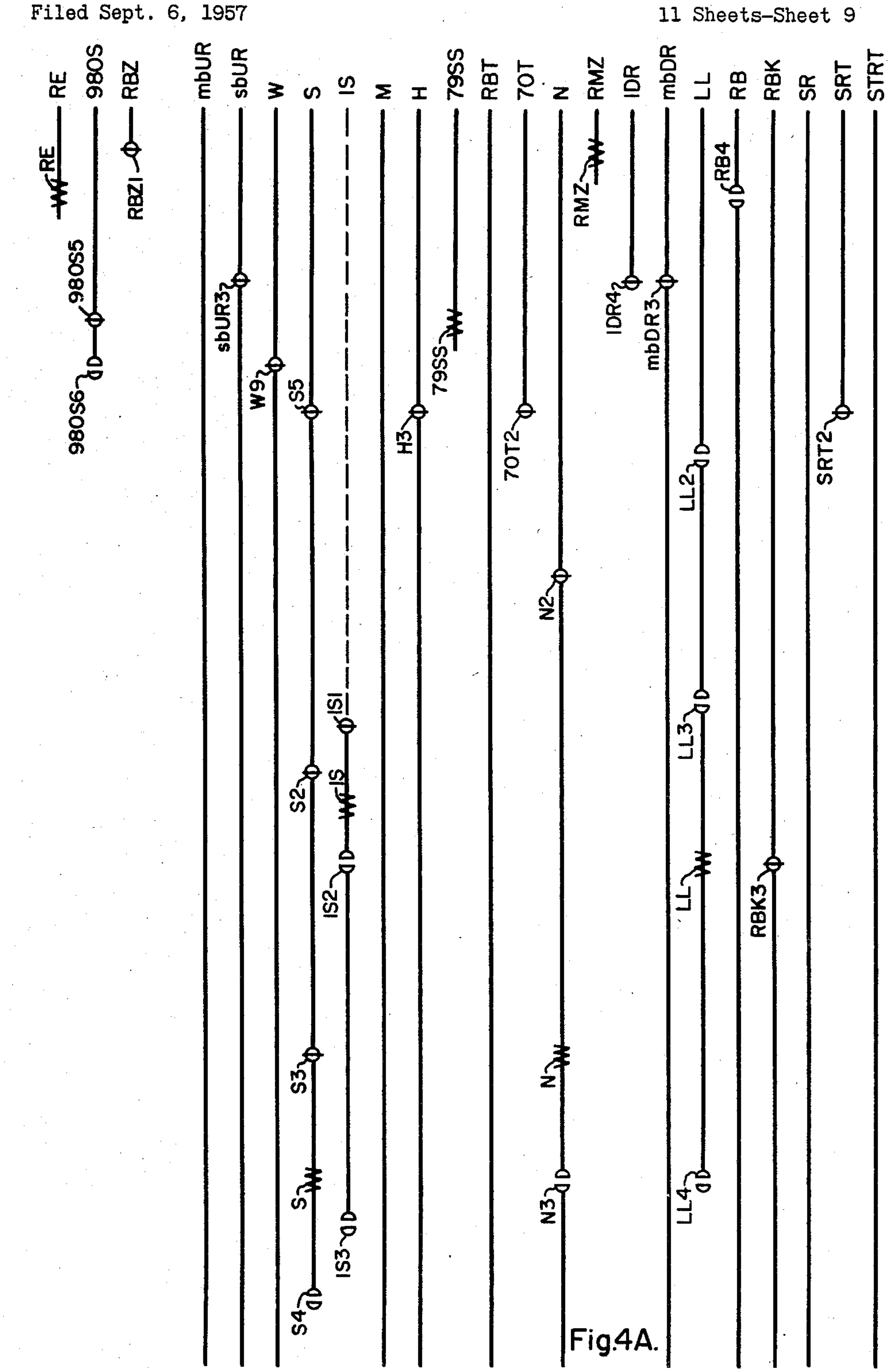

*Figure 4*

In Fig. 4 circuits are illustrated for controlling the energization of the basement master relay RMZ, the reset relay RE, the availability relay 79SS and the dispatching of the elevator cars from the lower-terminal floor.

When the elevator car A is in the basement area the break contacts RBZ1 are closed to energize the basement master relay RMZ. Similar contacts in parallel with the contacts RBZ are provided for each of the elevator cars serving the basement area.

When the elevator car A is assigned to proceed to the basement area the make contacts RB4 close to energize the reset relay RE. Similar contacts in parallel with the contacts RB4 are provided for each of the elevator cars serving the basement area.

If no elevator car is available for assignment to the basement area the stepping switch of Fig. 3 is permitted to complete only one cycle of operation until the availability relay 79SS picks up to indicate that an elevator car is available for assignment. For the elevator car A the relay 79SS may be energized through either of two circuits. One of the circuits is completed when the elevator car A is in service (make contacts 980S6 are closed) the elevator car is set for down travel (break contacts W9 are closed) and the elevator car is displaced from the upper-terminal floor (switch 94 is closed) the switch 94 is normally biased to closed condition and is cam operated to open only when the elevator car A is adjacent the upper terminal floor.

The second circuit for energizing the relay 79SS includes break contacts 70T2 of the non-interference relay and break contacts SRT2 which are closed when the elevator car A has stopped at a floor long enough to discharge and load passengers, normally-open contacts LTS which are closed only when the elevator car is at the lower-terminal floor, break contacts H3 which are closed when no car call is registered for a floor above the basement area and break contacts S5 which are closed when the elevator car A is not being started from the lower terminal floor.

Similar contacts control the energization of the relay 79SS for the elevator car B. However, for the elevator car B additional contacts also control the energization of the relay. Thus, the energization of the relay for the elevator car B is controlled by a switch 91A which opens and closes with the switch 91 of Fig. 3. If the switch 91A is open, energization of the relay 79SS requires closure of the contacts UPK2 and DP2 of the time switch TS and these contacts operate respectively with the contacts UPK1 and DP1 of Fig. 3.

The energization of the relay 79SS by the elevator car B also requires either of two additional conditions to be fulfilled. One of these conditions is that the elevator car A is not in service and break contacts 980SS consequently are closed. These contacts are shunted by a circuit which includes the break contacts *mb*DR3, 1DR4, *sb*UR3. Consequently, the shunt circuit is opened if a down floor call is registered at the main basement floor or at the first floor or if an up call is registered at the subbasement floor.

In Fig. 4, a dispatching device is illustrated which normally controls the dispatching of the elevator cars employed in the system from the lower-terminal or street floor.

The selection and timing mechanism include as one component a motor 71 which operates substantially at constant speed. This motor may be of any suitable type, but for present purposes it will be assumed that the motor is a separately-excited direct current motor having an armature 71A which is energized from the buses L1, LS1 through a resistor R3 and a field winding 71F energized through resistors R4, R5, R6 across the buses. The resistors may be shunted respectively by make contacts LL3, BLL3 and CLL3.

The motor 71 is connected through a spring-released electromagnetically-applied clutch 72 to a cam 73 having a protuberance for successively operating mechanical switches Y, BY, CY and DY which are associated with the respective elevator cars. The electromagnetic clutch can be energized only if one or more elevator cars are located at the dispatching floor which is assumed to be the first floor (one or more of the contacts LL2, BLL2 CLL2 and DLL2 are closed), and if no elevator car has been selected as the next car to leave the dispatching floor (break contacts N2, BN2, CN2 and DN2 all are closed).

The motor 71 also may be coupled through a spring-released electromagnetically-applied clutch 74 to a cam 75 which is biased towards a predetermined position by a spring 76. The cam 75, when coupled to the motor 71, is rotated against the bias of the spring to close normally-open contacts 77 a predetermined time after the cam 75 is coupled to the motor 71. The clutch 74 can be electrically energized only if no elevator car is being started (break contacts S2, BS2, CS2 and DS2 are closed), and if the break contacts 1S1 of the holding relay 1S are closed. The holding relay 1S is energized upon closure of the contacts 77, if contacts S2 to DS2 are closed, to close its make contacts 1S2 for the purpose of establishing a holding circuit around the contacts 77.

The presence of an elevator car at the dispatching floor is determined by the energization of a car-position relay for each of the elevator cars. Thus, if the switch 97C is closed a car-position relay LL for the elevator car A is energized when the brush *kk* engages the contact segment *k*1. If the switch 97C is open, the energizing circuit also includes the break contacts RBK3.

The brush *kk* is operated by the floor selector for the elevator car A to engage the contact segment *k*1 when the elevator car is at the dispatching floor.

If the elevator car A is at the dispatching floor (make contacts LL4 are closed), if it has been selected as the next car to leave the dispatching floor (switch Y is closed), and if it is not being started (break contacts S3 are closed), the loading relay N for the elevator car A is energized. The loading relay may be employed in a conventional way to permit loading of the elevator car A. For example, the loading relay when energized may operate a loading signal, such as a lamp, which indicates that passengers may enter the elevator car. Conveniently, the loading relay N when energized opens the normally-closed doors of the elevator car A to permit entry of passengers into the elevator car.

After the expiration of a time sufficient for the cam 75 to close the contacts 77 and energizes the relay 1S, the make contacts 1S3 close to complete the following circuit:

L1, LL4, S, N3, 1S3, L2

The relay S when energized closes its make contacts S4 to establish a holding circuit around the contacts N3 and 1S3, and starts the elevator car A from the dispatching floor.

*Operation*

In order to explain the over-all operation of the elevator system it will be assumed first that the elevator cars are at the first or dispatching floor when the system initially is energized. The cars are conditioned for operation in the up direction. For example, the elevator car A has its up-preference relay W energized. Consequently, make contacts W1 and W3 to W6 of the relay are closed, whereas break contacts W2, W8, W9 of the relay are open. Switches 97, 97A, 97B and 97C are assumed to be in the positions illustrated.

The motor 71 (Fig. 4) is energized to rotate at a substantially constant rate.

Inasmuch as the elevator cars are assumed to be at the dispatching floor, the car-position relays LL, etc. are energized. The relay 145 is assumed to be energized and the associated doors are closed.

As a result of its energization, the car-position relay LL opens its contacts LL1 (Fig. 1) and LL5 (Fig. 2) and closes its contacts LL2, LL3, and LL4 (Fig. 4) and LL6 (Fig. 3). Closure of the make contacts LL2 completes the following circuit for the clutch 72:

L1, LL2, 72, N2, BN2, CN2, DN2, L2

The clutch now couples the motor 71 to the cam 73 for the purpose of successively closing and opening the associated mechanical switches. It will be assumed that the first switch reached by the cam is the switch Y for the elevator car A. Closure of this switch completes the following energizing circuit for the loading relay of the elevator car A:

L1, LL4, N, S3, Y, L2

The loading relay N upon energization initiates opening of normally-closed doors of the elevator car A and may operate a signal to permit intending passengers on the dispatching floor to enter the elevator car. Thus the energized relay N opens its contacts N7 to interrupt energization of the door-control relay 145. This relay 145 opens its make contacts 145–1 and 145–2 without immediate effect on the system. However, closure of break contacts 145–3 completes with the switch 138 an energizing circuit for the door-open solenoid DO which opens the car door and the associated hoistway door.

In opening, the car door opens its set of contacts to deenergize the door relay DR (Fig. 1) which opens its contacts DR1 without immediate effect on system operation.

Opening of the break contacts N2 (Fig. 4) deenergizes the clutch 72. Consequently, the cam 73 is uncoupled from the motor 71. Finally, the make contacts N3 close to prepare the starting relay S for subsequent energization.

When the system was placed in operation, the clutch 74 was energized through the circuit:

L1, 1S1, 74, S2, BS2, CS2, DS2, L2

As a result of its coupling to the motor 71, the cam 75 rotates against the bias of its spring 76 until at the expiration of the time interval allowed for loading elevator cars the contacts 77 close. The rate of rotation depends on the number of resistors R4, R5 and R6 connected effectively in series with the field winding 71F. In the present case the contacts LL3, BLL3, CLL3 shunt all of the resistors and the motor rotates at a relatively slow rate. Closure of these contacts completes the following circuit:

L1, 1S, 77, S2, BS2, CS2, DS2, L2

The energized relay 1S closes its make contacts 1S2 to establish a holding circuit around the contacts 77. The break contacts 1S1 open to deenergize the clutch 74, and the spring 76 now rotates the cam to its starting position. Also, the make contacts 1S3 close to energize the auxiliary starting relay S through the following circuit:

L1, LL4, S, N3, 1S3, L2

Energization of the auxiliary starting relay S closes the make contacts S4 to establish a holding circuit around the contacts N3 and 1S3. Break contacts S3 open to deenergize the loading relay N. Break contacts S2 open, and this opening causes relay 1S to drop out. This has no immediate effect on the system operation.

The loading relay when deenergized opens its make contacts N3 without immediate effect on the operation of the system. In addition, break contacts N2 close to reenergize the clutch 72 to select another elevator car to leave the lower terminal floor in the manner previously set forth.

First, it will be assumed that the elevator cars are parked at the lower-terminal floor and that a passenger has entered the elevator car A at the lower-terminal floor for the purpose of proceeding to the fifth floor.

Upon entering the elevator car A, the passenger presses the car-call push button 5c (Fig. 2) to energize the associated car-call registering relay 5CR. This relay closes its self-holding contacts 5CR1. It will be assumed that the elevator car has been stopped at the lower terminal floor long enough for the relay 70T to time out and close its break contacts.

The deenergization of the loading relay N is employed for initiating a door closure at the first floor. When the relay N is deenergized it closes break contacts N7 (Fig. 2) to complete with the contacts SRT1, SR1 and 70T3 an energizing circuit for the door-control relay 145. The latter relay closes its make contacts 145–1 and opens its break contacts 145-3 without immediate effect on system operation. However, closure of make contacts 145–2 completes with the contacts DR–2 an energizing circuit for the door-close solenoid DC, and the door now starts to close. If a passenger is in the closing path of the door, he interrupts one of the beams of radiant energy and one of the sets of contacts PR1–1 or PR2–2 opens to deenergize the detector relay SR. This relay then opens its make contacts SR1 to deenergize the door-control relay 145. The latter opens its contacts 145–2 to deenergize the door-close relay and closes its contacts 145–3 to energize the door-open relay for the purpose of reopening a partly-closed door.

In some cases, it is desirable to prevent a reopening of the door by the relay SR. In such a case, the manually-operated switch 190 may be closed to connect make contacts 145–4 of the door-contral relay around the contacts SR1 and SRT1. When the door-control relay picks up, the resulting closure of its contacts 145–4 assures door closure despite subsequent dropout of the relay SR. For the following discussion, the switch 190 is considered to be open.

It will be assumed, however, that no person is in the closing path and that the door closes. Upon closing, the door closes its switch 133 to complete an energizing circuit for the door relay DR which closes its make contacts DR–1 and opens its break contacts DR–2 to deenergize the door-close solenoid DC.

Closure of the make contacts DR1 completes the following circuit:

L1, S1, W1, F1, 21, U, M, DR1, L2

Upon energization, the up switch U closes its make contacts U1 to release the elevator brake. Contacts U2 and U3 close to energize the generator field winding 17F with proper polarity for up travel of the elevator car. Contacts U4 close to complete the following energizing circuit for the speed relay V:

L1, U4, 19, E1, V, L2

The speed relay closes its make contacts V1 to shunt the resistor R1 and conditions the elevator car for full speed operation. The speed relay V also opens its break contacts V2 (Fig. 2) without immediate effect on the system operation.

Continuing with the operation of the up switch U, the energized up switch closes its make contacts U5 to establish a holding circuit around the contacts S1 and W1. Break contacts U6 open to prevent energization therethrough the down preference relay X.

The elevator car A now accelerates in the up direction for the purpose of carrying the passenger to the fifth floor.

As the elevator car leaves the lower-terminal floor the brush *kk* (Fig. 4) leaves the contact segment *k*1 to deenergize the terminal relay LL. Closure of contacts LL1 (Fig. 1) and opening of contacts LL2 and LL4 in Fig. 4 does not have any immediate effect on system operation. Opening of contacts LL3 introduces the resistor R21 in series with the field winding 71F to increase the speed of the motor 71. Closure of contacts LL5 (Fig. 2) registers a car call for the first floor. Opening of contacts LL6 (Fig. 3) has no immediate effect on system operation.

It will be recalled that the running relay M also was energized. As a result of its energization, the running relay closes its make contacts to prepare the relays G, E and F for subsequent energization. Make contacts M2 close to energize the non-interference relay 70T. The non-interference relay opens its break contacts 70T1 but such opening has no immediate effect on the operation of the system.

Referring to Fig. 2, the running relay M closes its make contacts M4 and opens its break contacts M5. Such contact operations have no immediate effect on the operation of the system.

However, the approach of the elevator car A towards the fifth floor brings the brush *bb* (Fig. 2) into engagement with the contact segment *b*5 to energize the car call stopping relay T through the circuit:

L1, H, 5CR1, *b*5, *bb*, W3, T, M4, L2

The car call stopping relay closes its make contacts T1 (Fig. 1) to energize through the contact M1 the three relays G, E and F in parallel. The relay G closes its make contacts G1 to establish a holding circuit around the contacts T1. The operation of the relay H will be considered below.

The energization of the inductor slowdown and stopping relays E and F prepares these relays for subsequent operation. As the elevator car A nears the fifth floor, the inductor slowdown relay E reaches the inductor plate UEP for the fifth floor which completes a magnetic circuit resulting in the opening of the normally-closed contacts E1. Such opening deenergizes the speed relay V. As a result of the deenergization of the speed relay V, make contacts V1 open to introduce the resistor R1 in series with the generator field winding 17F. The resulting decrease in the output of the generator slows the elevator car A to a landing speed. Closing of break contacts V2 (Fig. 2) has no immediate effect on the system.

As the elevator car A slowly approaches the fifth floor, the stopping relay F reaches the inductor plate UFP for the fifth floor. This completes a magnetic circuit which results in opening of the normally-closed contacts F1. In opening the contacts F1 deenergizes the up switch U and the running relay M.

The up switch U now opens its make contacts U1 to apply the elevator brake. Contacts U2 and U3 open to deenergize the generator field winding and the elevator car now stops accurately at the fifth floor. Opening of the make contacts U4 and U5 and closure of the break contacts U6 have no immediate effect on the operation of the system.

The running relay M opens its make contacts M1 to deenergize the relays G, E and F. The relay G opens its make contacts G1. Make contacts M2 open to deenergize the non-interference relay 70T. This relay now starts to time out. Opening of make contacts M4 (Fig. 2) has no immediate effect on system operation.

Referring to Fig. 2, it should be noted that as the elevator car A continues its approach toward the fifth floor, the brush *dd* engages the contact segment *d5*. When the running relay drops out to close its break contacts M5, the following cancelling circuit is completed:

L1, H, 5CR1, 5CRN, *d5*, *dd*, W4, M5, L2

Consequently, the car-call registering relay 5CR is reset. As the car comes to a stop, the brush *bb* passes slightly above the associated contact segment *b5*. The resetting of the call registering relay 5CR opens the make contacts 5CR1. Operation of the relay H will be considered below.

The dropout of the running relay M7 also results in opening of the make contacts M7 to deenergize the door-control relay 145. The relay 145 opens its make contacts 145–1, 145–2 and 145–4 without immediate effect on the system operation. However, closure of the break contacts 145–3 completes a door-opening circuit for the door-opening relay DO and the doors now open. Closure of contacts M8 illuminates the lamps LA1 and LA2.

As previously pointed out, the dropout of the timing relay 70T provides a non-interference time which may be of the order of 5 seconds. If a passenger leaves the elevator car at the fifth floor promptly, say, in 1 second, it follows that a substantial and unnecessary delay in the departure of the elevator car would be imposed if the relay 70T is allowed to complete its normal timing interval before the car departs from the third floor.

In the present case, the departure of the elevator car is expedited. By reference to Fig. 1B, it will be noted that as the passenger leaves the elevator car at the fifth floor, he temporarily interrupts the beams of radiant energy directed towards the photocells PC1 and PC2. Such temporary interruption temporarily interrupts and drops out the relays PR1 and PR2.

Referring to Fig. 1, it will be noted that the dropout of the relays PR1 and PR2 opens make contacts PR1–1 and PR2–1 to deenergize the detector relay SR. The detector relay opens its make contacts SR1 to prevent energization of the door-control relay 145 as long as the passenger stands in the closing path of the door. In addition, break contacts SR2 and SR3 close to energize the time delay relay SRT and the expediter relay 300. Energization of the time delay relay SRT results in opening of the break contacts SRT1 and SRT2 (Fig. 4) without immediately affecting the operation of the system. The expediter relay 300 opens its break contacts to instantly drop out the timing relay 70T. Since the timing relay is now dropped out, it closes its break contacts 70T3. However, since the contacts SR1 and SRT1 are open, the door-control relay 145 cannot be energized. In addition, break contacts 70T2 (Fig. 4) close without immediate effect on the operation of the system. Closure of the break contacts SR4 energizes the relay STRT which opens its break contacts STRT1 and STRT3 (Fig. 3) and STRT 2 (Fig. 6) without immediate effect on system operation.

It will be assumed that the passenger passes promptly through the doorway and that the beams of radiant energy are promptly reapplied to their associated photocells. As a result of such reappplication, the make contacts PR1–1 and PR2–1 reclose to energize the detector relay SR. This relay opens its break contacts SR3 to deenergize the expediter relay 300, but the reclosure of the break contacts 300–1 opening has no immediate effect on the operation of the system. Opening of the break contacts SR2 initiates a timing out operation of the time delay relay SRT. Closure of the make contacts SR1 has no immediate effect on the energization of the door control relay 145 for the reason that the contacts SRT1 are still open.

Opening of the break contacts SR4 starts a timing out operation of the relay STRT but this relay in dropping out does not immediately affect system operation.

Upon the expiration of the one-half second time delay in dropout of the relay SRT, this relay drops out to close its break contacts SRT1 and complete the energizing circuit for the door-control relay 145. This relay thereupon operates in the manner previously described to initiate a door-closing operation of the door of the elevator car A and the starting of the elevator car A from the fifth floor. It should be noted that this operation may save several seconds of time in starting the elevator car from the fifth floor. Closure of the break contacts SRT2 (Fig. 4) has no effect on the system at this time.

Should another passenger immediately follow the first passenger to leave the elevator car at the third floor, the radiant energy beams again would be interrupted to deenergize the detector relay SR. This relay would reclose its break contacts SR2 to reenergize the time delay relay SRT. Since the relay SRT has not yet dropped out, the reenergization thereof occurs before the elevator car door starts to close and delays reclosure of the door for the full time delay of the relay SRT. If a large number of passengers follow each other out of the elevator car A, it follows that the relay SRT is reset in response to each departure of a passenger. A similar operation results from the successive entry of a plurality of passengers into the elevator car. Following the entry of the last passenger, the relay 145 is operated to close the door, pick up the relay DR and start the elevator car.

When the contacts DR1 of the door relay are closed the following circuit is completed:

L, 21A, LL1, W1, F1, 21, U, M, DR1, L2

The elevator car now starts in the up direction by the sequence previously discussed.

Next it will be assumed that as the elevator car A was leaving the first floor in the preceding example, a prospective passenger at the second floor registered an up floor call by operation of the up floor call push button 2U (Fig. 2). Such operation energizes the up floor call registering relay 2UR which closes its contact 2UR1 to establish a holding circuit around the push button.

As the elevator car A nears the second floor, the brush *ee* engages the contact segment *e2* to establish the circuit:

L1, 2UR1, *e2*, *ee*, W5, Z, L2

The resultant energization of the floor call stopping relay Z results in closure of the make contacts Z1 (Fig. 1) to energize the relays G, E and F. These cooperate to stop the elevator car A at the second floor and operate the door by a sequence which will be clear from the preceding discussion of the stopping of the elevator car at the fifth floor. As the elevator car stops, the engagement of the brush *ff* with the contacts segment *f2* and the closure of the break contacts V2 completes the following cancelling circuit:

L1, 2UR1, 2URN, *f2*, *ff*, W6, V2, L2

This resets the up floor call registering relay 2UR in the manner previously described. As a result of this resetting, the relay opens its contacts 2UR1.

Next it will be assumed that a prospective passenger at the fourth floor registers a down floor call by operation of the push button 4D (Fig. 2) after the elevator car A reached the fifth floor. The resultant energization of the down-floor-call registering relay 4DR closes the make contacts 4DR1 to establish a holding circuit around the push button. It will be assumed that the doors have reclosed in the manner previously set forth to close the contacts DR1. Consequently, the up switch U and the running relay M are energized in the manner previously described to move the car upwardly to the upper-terminal floor. As the elevator car A nears the upper-terminal floor, the brush *bb* (Fig. 2) engages the segment *b6* to complete the following energizing circuit:

L1, *b6*, *bb*, W3, T, M4, L2

The relay T closes its make contacts T1 (Fig. 1) to energize the relays G, E and F. These relays initiate a stopping operation of the elevator car A at the sixth floor in a manner which will be clear from the earlier discussion of the stopping of the elevator car at the fifth floor. As it reaches the sixth floor, the elevator car A opens its limit switch 23 (Fig. 1) to deenergize the up preference relay W. Since this relay closes its break contacts W2 and the break contacts U6 close as the car stops, an energizing circuit is completed for the down preference relay X through the limit switch 24. The deenergization of the up preference relay and the energization of the down preference relay condition the elevator car A for down travel.

It will be understood that a dispatcher may be provided for the upper terminal floor which operates in a manner similar to that of the dispatcher for the first floor. Thus the contacts TN7 control the opening and closing of the elevator car door in a manner similar to that discussed for the operation of the contacts N7 when the car was at the first floor.

The contacts DR1 next close by a sequence which will be understood from the foregoing discussion to complete the circuit:

L1, 21A, LL1, X1, F2, 22, D, M, DR1, L2

The relay D upon energization closes its make contact D1 to release the elevator brake. Contacts D2 and D3 close to energize the generator field with proper polarity for down travel. Contacts D4 close to complete through the limit switch 20 and the contacts E2, an energizing circuit for the speed relay V. This relay closes its make contacts V1 to shunt the resistor R1. The elevator car A now accelerates to its full speed in the down direction.

Closure of the make contacts D5 establishes a holding circuit around the contacts 70T1, LL1, and X1. Opening of the break contacts D6 has no immediate effect on the operation of the system. The running relay M upon energization operates its contacts in the manner previously described.

As the elevator car A nears the fourth floor, the brush *gg* engages the contact segment *g4* (Fig. 2) to complete the following energizing circuit:

L1, 4DR1, *g4*, *gg*, X6, Z, L2

As a result of its energization, the floor call stopping relay Z closes its make contacts Z1 to energize the relays G, E and F. The relay G closes its make contact to establish a holding circuit around the contacts Z1. The continued movement of the elevator car A brings the inductor slow down relay adjacent the plate DEP for the fourth floor and completes a magnetic circuit resulting in opening of the contacts E2. Such opening results in deenergization of the speed relay V and this relay closes its contacts V2 (Fig. 2) and opens its make contact V1 (Fig. 1) to introduce the resistor R1 in series with the generator field winding. The decrease in energization of the field winding slows the elevator car to a landing speed. The continued movement of the elevator car A at a slow speed brings the inductor stopping relay F adjacent the inductor plate DFP to open the contacts F2. Such opening deenergizes the down switch D and the running relay M. The down switch D opens its make contacts D1 to apply the elevator brake. Contacts D2 and D3 open to deenergize the generator field winding and the elevator car stops accurately at the fourth floor. Opening of the make contacts D4 and D5 and closure of break contacts D6 have no immediate effect on the operation of the system.

During the stopping operation of the brush *hh* (Fig. 2) engages the contact segment *h4* to complete the following cancelling circuit:

L1, 4DR1, 4DRN, *h4*, *hh*, X7, V2, L2

In resetting, the relay 4DR opens its holding contacts 4DR1. If the doors are closed, an energizing circuit again is completed for the down switch D and the running relay M. These cooperate in the manner previously discussed to move the elevator towards the first floor.

As the elevator car A nears the first floor, the brush *aa* (Fig. 2) engages the contact segment *a1* to complete an energizing circuit for the car-call stopping relay T. This relay closes its make contacts T1 to energize the relays G, E and F through the contacts M1. The energized relays E and F cooperate in the manner previously described to stop the elevator car A at the first floor. As the car reaches the first floor the brush *kk* (Fig. 4) engages the segment *k1* to energize the terminal relay LL. This relay opens its contacts LL1 (Fig. 1), closes its contacts LL2, LL3 and LL4 (Fig. 4) and LL6 (Fig. 3) and opens its contacts LL5 (Fig. 2). As the elevator car stops, the brush *dd* engages the contact segment *d1* to complete the following cancelling circuit:

L1, H, 1CR1, 1CRN, *d1*, *dd*, W4, M5, L2

In resetting, the relay 1CR opens its holding contacts 1CR1.

*Basement operation*

For a first illustration of the operation of the system when responding to a call for basement service, it will be assumed that the push button *sb*U (Fig. 3) is operated to register a call for the subbasement floor. For present purposes it is assumed that the doors are manually operated and that the contacts 300–1, STRT1 (Fig. 3) and SRT2 (Fig. 4), remain closed. Such operation completes with the switch 89 an energizing circuit for the registering relay *sb*UR for the subbasement floor and this relay closes its holding contacts *sb*UR1. Break contacts *sb*UR3 open (Fig. 4). In addition, make contacts *sb*UR2 close (Fig. 3).

If the elevator car A is not in service, the make contacts 980S2 are open and closure of the make contacts *sb*UR2 does not affect the operation of the system. For present purposes, it will be assumed that the elevator car A is in service and that the make contacts 980S2 are closed.

If one of the elevator cars, such as the elevator car A is in the basement area, its switch 93 is open and the basement zone relay RBZ is deenergized. Since this relay RBZ is deenergized, its break contacts RBZ1 (Fig. 4) are closed and the basement master relay RMZ is energized and the break contacts RMZ1 (Fig. 3) are open. Consequently, as long as an elevator car is in the basement area the closure of the make contacts *sb*UR2 has no effect on the operation of the system.

It will be assumed that at the time the make contacts *sb*UR2 are closed the elevator car A is traveling up and approaching the upper terminal floor whereas the elevator car B has just left the lower terminal floor in the up direction. Under these circumstances, the break contacts W9 (Fig. 4) and BW9, and the switches LTS and BLTS are open and the availability relay 79SS is deenergized.

As a result of the closure of the make contacts *sb*UR2 the following circuit is now completed:

L1, SSW, SSC, RMZ1, 980S2, *sb*UR2, L2

The stepping switch SS now starts to step from its reset position illustrated in Fig. 3. Under the assumed conditions, the contacts LL6, W8, N5, BLL6, BW8 and BN5 all are open. Consequently, the stepping switch continues to step until the brush SSA engages the contact segment SS7. At this time a continuous energizing circuit is established for the winding SSW through the break contacts RE4, the brush SSA, the contact segment SS7 and the break contacts 79SS, of the availability relay.

The elevator car A now reaches the upper terminal floor and opens the switch 94 (Fig. 4). In addition, break contacts W9 of the up-preference relay close as the elevator car is set for down travel.

As the elevator car A moves away from the upper terminal floors, the switch 94 recloses to complete with the contacts W9 and 980S6 an energizing circuit for the availability relay 79SS. This relay opens its break contacts 79SS1 (Fig. 3) to interrupt the energizing circuit for the winding SSW, and the stepping switch SS again starts a scanning cycle. Inasmuch as the break contacts W8 of the up-preference relay and the switch 90 are now closed, the engagement of the brush SSA with the contact segment SS2 completes the following circuit:

L1, SSW, RE4, SSA, SS2, 90, W8, 980S3, L2

Since the winding SSW now is continuously energized the stepping switch rests with the brush SSA in engagement with the contacts segments SS2 and with the brush SSB in engagement with the contacts segments SS12. The following energizing circuit now is completed:

L1, RE1, SSB, SS12, X8, X9, RB, L2

At the expiration of its time delay in pick up, the relay RB picks up to assign the elevator car A to proceed into the basement area. Such assignment includes closure of the make contacts RB3 to establish with the switches 92 and 97B a self-holding circuit. In addition, break contacts RB1 open (Fig. 1) and make contacts RB2 close without immediately affecting the operation of the system. Closure of make contacts RB4 (Fig. 4) energizes the reset relay RE.

The reset relay RE opens its break contacts RE1 and closes its make contacts RE3 without immediate effect on the operation of the system. Opening of the break contacts RE4 interrupts the energizing circuit for the stepping winding SSW. Closure of the make contacts RE2 completes with the self-stepping contacts SSC an energizing circuit for the winding SSW. The stepping switch now proceeds to step until the brush SSD engages the contact segment SS28 to complete an energizing circuit for the winding SSW which is maintained until the make contacts RE3 open. Inasmuch as the stepping switch winding SSW now is continuously energized the stepping switch remains at rest with its brush SSA in engagement with the contact segment SS8, the brush SSB in engagement with the contact segment SS18, and the brush SSD in engagement with the contact segment SS28.

The elevator car A now continues its downward movement serving the floors of the structure in the manner previously described until the elevator car reaches the lower-terminal floor. As the elevator car reaches the lower-terminal floor the switch 24 (Fig. 1) opens. However, since the make contacts RB2 are now closed, the down preference relay X remains energized and the elevator car continues to be set for down travel. Consequently, when the doors associated with the elevator car have been reclosed, the elevator car A proceeds in the down direction until the brush *aa* (Fig. 2) engages the contact segment *asb* to complete an energizing circuit for the car-call stop relay T which stops the elevator car at the subbasement floor in the manner previously described.

As the elevator car reaches the subbasement floor the switch 89 (Fig. 3) opens to reset the registering relay *sb*UR for the subbasement floor. This relay opens its make contacts *sb*UR1 and *sb*UR2 and closes its break contacts *sb*UR3 (Fig. 4) without immediately affecting the operation of the system.

The elevator car A also opens the switch 92 to deenergize the basement service relay RB. This relay closes its break contacts RB1 (Fig. 1) to prepare the up preference relay W for energization. The relay also opens its make contacts RB2. Since the switch 24 remains open while the elevator car is in the basement area the down preference relay X is deenergized and the elevator car A is set for up travel by a sequence which will be understood from the foregoing discussion.

The basement service relay opens its make contacts RB3 (Fig. 3) without immediately affecting the operation of the system. However, opening of the make contacts RB4 (Fig. 4) deenergizes the reset relay RE. This relay closes its break contacts RE1 and RE4 and opens its make contacts RE2 without immediately affecting the operation of the system. However, the opening of the make contacts RE3 deenergizes the winding SSW and the spring 85 (Fig. 5) now advances the brushes of the stepping switch one step to the reset position illustrated in Fig. 3. The elevator car A now receives the passenger at the subbasement floor and proceeds to the lower-terminal floor by a sequence which will be understood from the foregoing discussion.

As a further example, it will be assumed that a prospective passenger at the main-basement floor registers a call for elevator service in the up direction by operating the push button *mb*U (Fig. 2) to energize the call registering relay *mb*UR. This relay closes its self-holding contacts *mb*UR1. In addition, make contacts *mb*UR3 close without affecting the immediate operation of the system. Closure of make contacts *mb*UR2 close to complete with the break contacts RMZ1 an energizing circuit for the winding SSW, and the stepping switch starts to step. It will be assumed that at the time the push button was operated the elevator car A had departed in the up direction from the lower-terminal floor and that the elevator car B was at the lower-terminal floor and had been selected by the dispatcher to leave the lower terminal floor.

Under the assumed conditions, the make contacts BN5 are closed and it is also assumed that the contacts BSTRT3 are closed, that no car calls are registered in the elevator car B and that the break contacts BH2 of the car-call relay consequently are closed. Under these circumstances, a continuous energizing circuit for the winding SSW is reached as follows:

L1, SSW, RE4, SSA, SS6, BN5, BSTRT3, BH2, 91, *mb*UR3, L2

Upon expiration of the time delay in pick up of the basement service relay BRB, this relay picks up through the circuit:

L1, RE1, SSB, SS16, B*t1*, B*tt*, BH1, BRB, L2

Such pick up of the relay BRB assigns the elevator car B to proceed into the basement area by a sequence which will be understood from the discussion of the assignment of the elevator car A to the basement area as a result of energization of the basement service relay RB. The resetting of the stepping switch also will be understood from the previous discussion of a resetting operation following assignment of the elevator car A to serve the basement area.

Next let it be assumed that the elevator car doors are operated automatically in the manner previously set forth, that the car A is positioned at the lower terminal floor (brush *tt* engages contact segment *t*1 in Fig. 3), that the elevator car is set for up travel (make contacts X9 are open in Fig. 3), and that the elevator car is available for loading (the loading relay N is picked up, the break contacts N7 (Fig. 1) are open to maintain the doors open in the manner previously set forth and the contacts N6 (Fig. 6) are closed to illuminate the up floor lantern LAU). At this point two passengers enter the car one desirous of proceeding to the fifth floor and one desirous of proceeding to the main basement floor.

As each passenger enters the elevator car, he interrupts the light beams to deenergize the relay SR. It will be recalled that each deenergization of the relay SR results in closure of the contacts SR4 to energize the passenger-entering relay STRT, which opens its break contacts STRT1 (Fig. 3). When the light beams are cleared, the detector relay SR picks up to reopen its contacts SR4 and the relay STRT starts to time out. The relay STRT may have a time delay in drop out of the order of three seconds.

Let it be assumed that the passenger who desires to proceed to the main basement operates the push button *mbc*1 (Fig. 3). Inasmuch as the contacts X9 and STRT1 are both open, such operation cannot energize the basement service relay RB to assign the elevator car to proceed to the basement area.

Let it be assumed that the passenger who desires to proceed to the fifth floor presses the push button 5*c* to register a car call for the fifth floor in the manner previously discussed. It will be recalled that such registration picks up the car-call relay H which opens its break contacts H1 (Fig. 3) to prevent assignment of the elevator car to the basement area before the fifth floor call is answered.

If neither of the passengers registers a call, the passenger-entering relay STRT drops out at the end of three seconds to permit energization through the contacts STRT1 of the basement service relay RB by operation of the push button *mbc*1.

Thus a person desirous of proceeding to a higher floor is given a minimum preference period of three seconds within which to register his call. This is desirable for the reason that a person desiring basement service should know by the illuminated up floor lantern that the elevator car is set for up travel.

Let it be assumed now that immediately after the two persons entered the elevator car A a third person at the lower terminal floor operated the push button 1D to register a down floor call or a basement floor call is registered. The stepping switch now starts to find an elevator car available for basement service in the manner previously discussed. Because of the entry of the person into the elevator car, the passenger-entering relay STRT is picked up and is timing out. At this stage the brush SSA engages the contact segment SS3. Inasmuch as the elevator car A is set for up travel (make contacts X10 are open) and the passenger-entering relay STRT is still timing out (break contacts STRT3 are open) the stepping switch cannot select the elevator car A. Consequently a person entering the elevator car A is again given a minimum of three seconds (the time delay of the relay STRT) within which to register a call for a higher floor before the direction of the car can be reversed.

Figure 6:
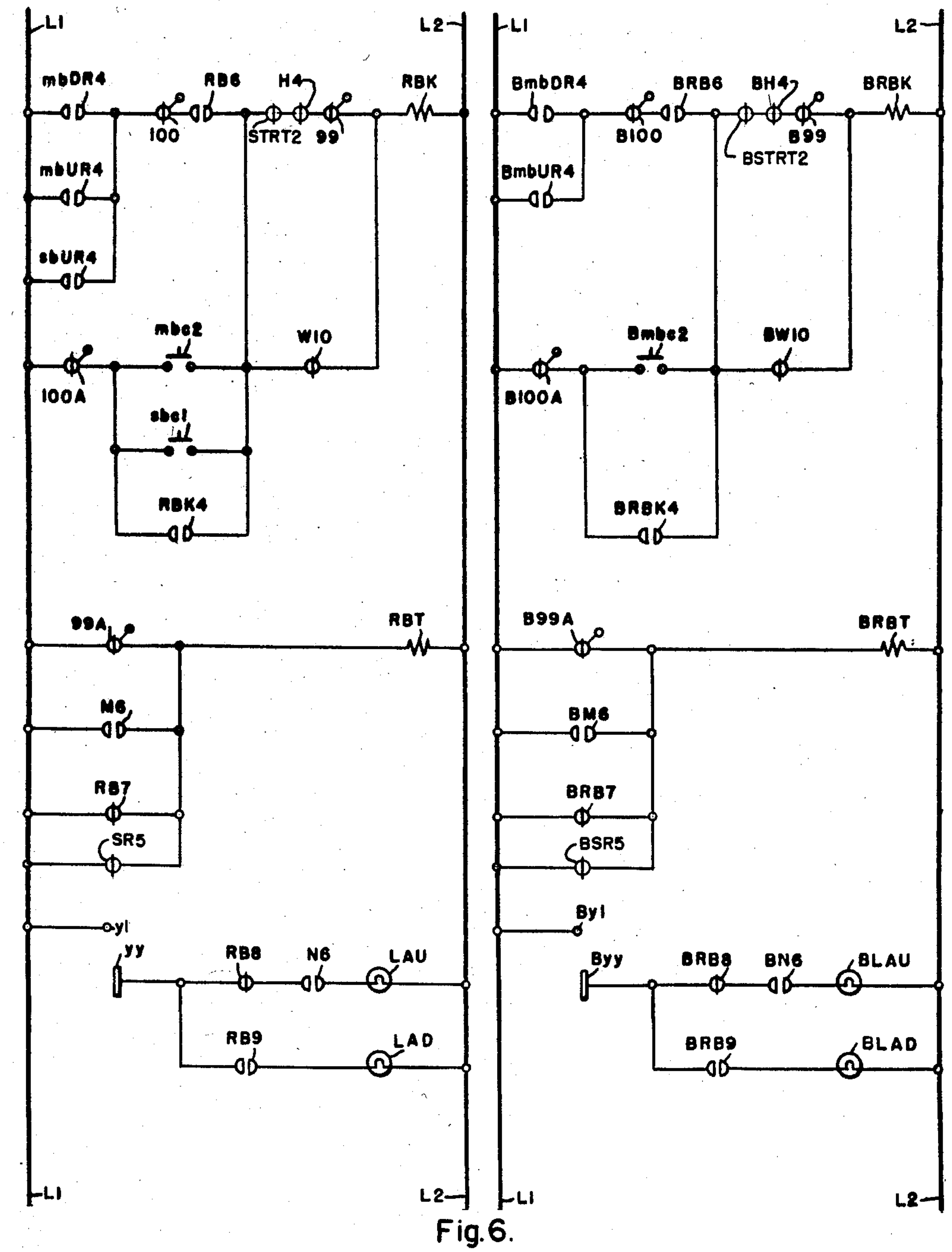
Figure 6A:
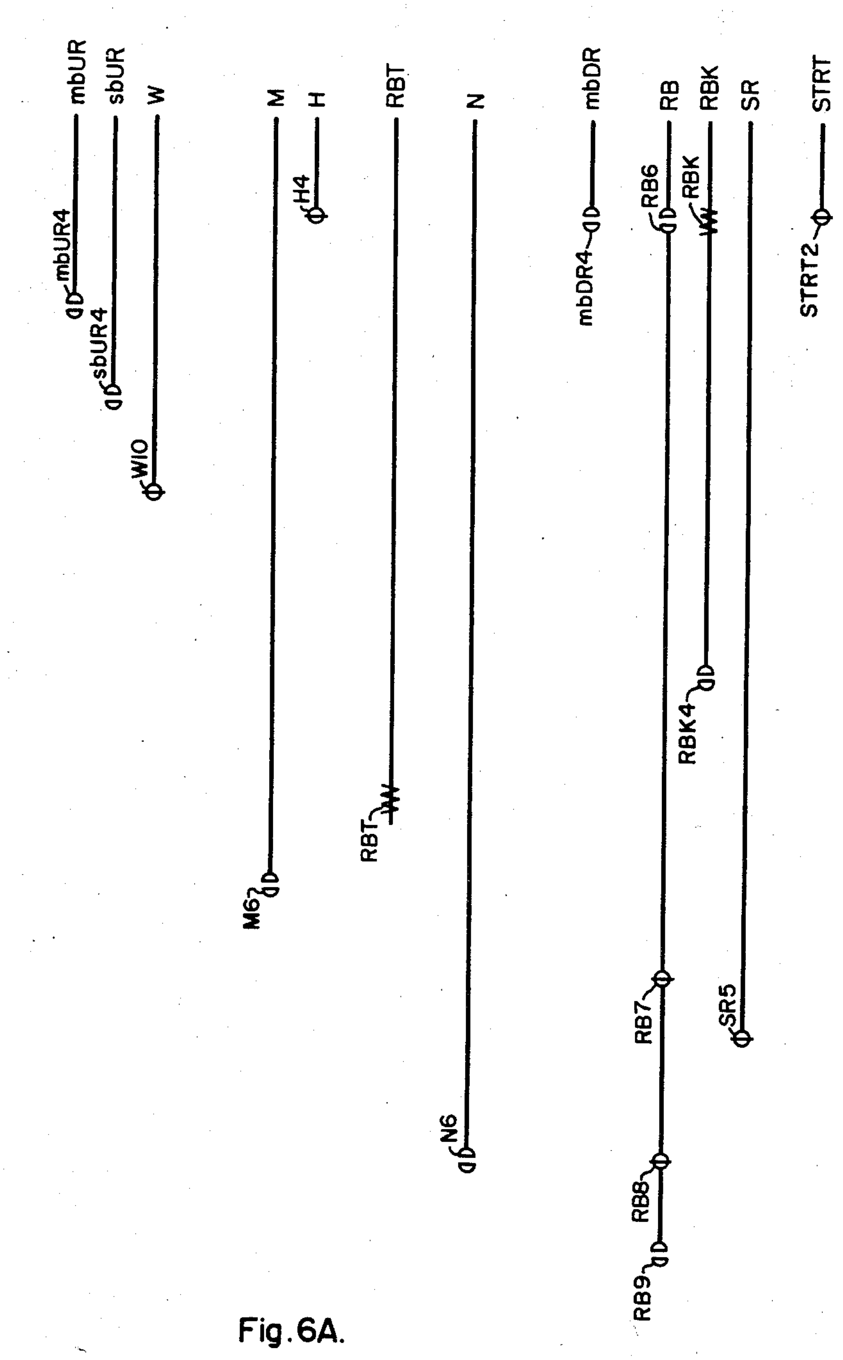

*Figure 6*

Although the system as thus far specifically described operates adequately for many installations, improper operation of the down floor button for the first floor may result in assignment of an elevator car for basement service, even though the person operating the push button does not enter the elevator car for the purpose of proceeding to the basement area. For the purpose of preventing such improper operation, the assignment may be dependent on reasonably prompt utilization of the car by the person. Thus, two additional relays RBK and RBT may be added to the system, and circuits for such relays are illustrated in Fig. 6.

The basement running relay RBK is energized when a call is registered which may be answered by movement of the elevator car A into the basement area except for a call registered by the down floor call registering relay 1DR. For example, if the elevator car A is proceeding down towards the first floor, registration of a call for a basement floor by a passenger in the elevator car A results in energization of the basement running relay RBK. Under such circumstances, the break contacts W10 of the up-preference relay are closed. In addition, the mechanically-operated switch 100A also is closed. This switch is cam operated to open only when the elevator car A is adjacent the subbasement floor. If the passenger desires to proceed to the main basement floor, he closes the switch *mbc*2. These contacts are connected to the switch *mbc*1 of Fig. 3 and *mbc* of Fig. 2 for simultaneous operation by a passenger in the elevator car.

Should the passenger desire to proceed to the subbasement floor, he closes the switch *sbc*1. This switch is connected with the switch *sbc* of Fig. 3 for simultaneous operation by the passenger in the elevator car. Under the assumed conditions, closure of either of the switches *mbc*2 or *sbc*1 results in energization of the basement running relay RBK. This relay closes its make contacts RBK4 to establish a holding circuit around the switches *mbc*2 and *sbc*1.

Inasmuch as the elevator car B does not serve the subbasement floor a switch corresponding to switch *sbc*1 is not provided for the elevator car B. The switch B100A is designed to open only when the elevator car B is adjacent the main basement floor.

Contacts of floor registering relays for the main basement and subbasement floors are connected in parallel for the purpose of further controlling the energization of the basement running relay. Thus, if the elevator car is traveling down towards the first floor (contacts W10 are closed), if the basement service relay RB is energized to close its make contacts RB6, and if a mechanically-operated switch 100 is closed (this switch is open only when the car is at the subbasement floor), operation of a floor call registering relay for one of the basement floors to close the contacts *mb*DR4, *mb*UR4 or *sb*UR4 completes an energizing circuit for the basement running relay RBK.

Inasmuch as the elevator car B does not serve the subbasement floor, contacts corresponding to the contacts *sb*UR4 are not provided for the elevator car B. Also the switch B100 is designed to open when the elevator car B is adjacent the main basement floor.

It will be noted that the break contacts W10 of the down-preference relay W are shunted by break contacts STRT2 of the passenger-entering relay STRT, break contacts H4 of the car-call relay H and a mechanically operated switch 99 which is closed only when the elevator car is at the first floor. Consequently, even though the break contacts W10 are open to indicate that the elevator car is set for up travel, if the elevator car is at the first floor (switch 99 is closed) and if no passenger has entered the elevator car recently (break contacts STRT2 are closed) and if the elevator car has no registered car call for a floor above the first floor (break contacts H4 are closed), the relay RBK still may be energized.

The purpose of the basement timing relay RBT is to measure a time delay sufficient to permit a passenger at the first floor to enter the elevator car A and to register a car call for one of the basement floors. This relay is energized if the elevator car A is away from the first floor (mechanically-operated switch 99A is open only if the elevator car A is at the first floor).

The relay also is energized if the elevator car A is running (make contacts M6 are closed). The relay RBT is energized if the elevator car is not selected for basement service (break contacts RB7 are closed). Finally, the relay RBT is energized if a person is in the car doorway (break contacts SR5 are closed). When the energization of the relay RBT is terminated, the relay requires a substantial time to drop out. This time is sufficient to permit entry of the passenger into the elevator car and registration of a car call for a basement floor by the passenger.

If the elevator car A during down travel arrives at the first floor with a large number of pasengers to be discharged, the relay RBT may drop out before a waiting passenger can enter the car to register a basement car call. To prevent such premature dropout the break contacts SR5 are provided to reenergize the relay RBT for each departure of a passenger from the elevator car.

As well understood in the art, it is desirable to provide each elevator car with floor lanterns at each floor for the purpose of indicating the direction in which the elevator car will move away from each of the floors at which it is stopped. An up lantern LAU and a down lantern LAD are illustrated in Fig. 6 for the elevator car A. These lanterns are located at the first floor and are energized through a contact segment *y1* and a brush *yy* which are associated with the floor selector. The brush engages the contact segment only when elevator car A is at the first floor. Energization of the up lantern also requires closure of the make contacts N6 of the loading relay and closure of the break contacts RB8 of the basement service relay. Energization of the down lantern LAD requires closure of the make contacts RB9 of the basement service relay and engagement of the contact segment *y1* by the brush *yy*.

The effect of the circuits illustrated in Fig. 6 on the operation of the elevator system will be considered. It will be assumed that the elevator car A is moving down towards the first floor when an intending passenger at the first floor operates the push button 1D (Fig. 2) for the purpose of registering a down floor call. The effect of registration of such a call previously has been considered. It will be assumed that the stepping switch of Fig. 3 operates in the manner previously described for the purpose of selecting the elevator car A to serve the down floor call at the first floor. Such selection results in energization of the basement service relay RB.

It is assumed that the switch 97B (Fig. 3) is open. Consequently, energization of the basement service relay RB results in the completion of a circuit through the contacts RB3, RBT1 and the switch 92. The contacts RBT1 are closed for the reason that the elevator car is away from the first floor and the switch 99A (Fig. 6) consequently is closed.

The basement service relay operates in the manner previously described. Opening of break contacts RB7 and RB8 and closure of the make contacts RB9 have no effect on the immediate operation of the system.

Closure of make contacts RB6 also has no immediate effect on the operation of the system.

The elevator car A now reaches the first floor and stops by a sequence which will be understood from the foregoing discussion. As the elevator car reaches the first floor, the switch 99A (Fig. 6) opens, and the contacts M6 also open (break contacts RB7 are open). The relay SR picks up to open its break contacts SR5. The relay RBT now starts to time out. If nothing further happens before the expiration of the time delay in dropout of the relay RBT, this relay finally drops out to open its make contacts RBT1 (Fig. 3). Such opening deenergizes the basement service relay RB and cancels the assignment of the elevator car A to serve the basement area.

If the elevator car contains passengers to be discharged from the elevator at the first floor, each passenger to leave the car interrupts the light beams to drop out the relays PR1 and PR2 (Fig. 1B) and consequently to drop out the detector relay SR. In addition to the operations previously discussed, the detector relay SR closes its contacts SR5 (Fig. 6) briefly for each departing passenger to reenergize the basement timing relay RBT before the latter relay can drop out. Thus the full time delay of the relay RBT is available after the departure of the last passenger to leave the elevator car. If nothing further happens before the expiration of the time delay, the relay RBT finally drops out to cancel the basement assignment of the car A. An intending basement passenger may wait until all passengers have departed and still have the full time delay of the relay RBT within which to enter the elevator car A and register a basement car call.

Let it be assumed next that before the relay RBT drops out, a passenger enters the elevator car and registers a call for the main basement floor. As a result of such registration, the switch *mbc*2 (Fig. 6) completes with the switch 100A and the break contacts W10 an energizing circuit for the basement running relay RBK. This relay closes its make contacts RBK4 to establish a holding circuit around the switch *mbc*2. In addition, break contacts RBK1 (Fig. 2) open. If these contacts open before the elevator car reaches the first floor, the elevator car would not stop at the first floor unless a car call for the first floor were registered to close the make contacts 1CR2. This assumes that the switch 97 is in its upper position, as viewed in Fig. 2 and that the switch 97A is open. However, under the assumed conditions, the elevator car has already stopped at the first floor, and the opening of the break contacts BRK1 has no immediate effect on the operation of this system.

Referring now to Fig. 3, it will be noted that closure of the make contacts RBK2 completes with the switch 92 a holding circuit for the basement service relay RB.

Break contacts RBK3 (Fig. 4) open. Since the switch 97C is assumed to be opened, the opening of the break contacts RBK3 prevents energization of the terminal relay LL and thus removes the elevator car A from the dispatching system. Furthermore, since the contacts LL1 (Fig. 1) are closed, the elevator car is conditioned to start as soon as non-interference relay 70T times out to close its break contacts 70T3 and the doors close. Thus, the elevator car A now is conditioned to proceed to the basement area for the purpose of serving the registered car call.

The operation of the lanters now will be considered. When the elevator car reached the first floor, the brush *yy* (Fig. 6) engaged the contact segment *y1* to complete with the closed contacts RB9 an energizing circuit for the down lantern LAD. If no passenger entered the elevator car at the first floor, and if the assignment of the car to the basement area was cancelled in the manner previously described, the make contacts RB9 open to extinguish the down lantern LAD. In addition, the break contacts RB8 close to place the up lantern under control of the make contacts N6 of the loading relay N. Consequently, when the elevator car A is next selected to leave the lower terminal floor in the up direction, the make contacts N6 close to complete an energizing circuit for the up lantern.

Although the invention has been discussed with reference to certain specific embodiments thereof, numerous modifications falling within the spirit and scope of the invention are possible. For this reason, the foregoing discussion and the drawing are to be interpreted in an illustrative rather than in a limiting sense.

We claim as our invention:

1. In an elevator system, a structure having a plurality of landings including a first terminal landing, an extension landing and a second terminal landing intermediate the first terminal landing and the extension landing, an elevator car having a doorway, means mounting the elevator car for movement relative to the structure from the extension landing towards the first terminal landing to serve the landings, motive means for moving the elevator car, and control means cooperating with the motive means to move the elevator car and to stop the elevator car at predetermined landings, said control means comprising means conditioning said elevator car to operate between said terminal landings, call means operable for registering a call for elevator service to be answered by movement of the elevator car to the extension landing, assigning means responsive to operation of said call means for assigning the elevator car to proceed to the extension landing for answering the call registered by the call means, detector means responsive to movement of a person substantially through said doorway for operation from a first condition to a second condition, and means responsive to operation of the detector means to said second condition for temporarily modifying the response of the assigning means to the operation of the call means.

2. In an elevator system, a structure having a plurality of landings including a first terminal landing, an extension landing and a second terminal landing intermediate the first terminal landing and the extension landing, an elevator car having a doorway, means mounting the elevator car for movement relative to the structure from the extension landing towards the first terminal landing to serve the landings, motive means for moving the elevator car, and control means cooperating with the motive means to move the elevator car and to stop the elevator car at predetermined landings, said control means comprising means conditioning said elevator car to operate between said terminal landings, call means operable for registering a call for elevator service to be answered by movement of the elevator car to the extension landing, assigning means responsive to operation of said call means while said elevator car is positioned at the second terminal landing and is conditioned to leave the second terminal landing in the direction of the first terminal landing for assigning said elevator car to reverse and proceed to the extension landing for answering the call registered by the call means, detector means responsive to movement of a person substantially through the doorway for temporary operation from a first condition to a second condition, and assignment-control means responsive to operation of the detector means to said second condition for temporarily rendering the assigning means ineffective to assign the elevator car to proceed to the extension landing.

3. In an elevator system, a structure having a plurality of landings including a first terminal landing, an extension landing and a second terminal landing intermediate the first terminal landing and the extension landing, an elevator car having a doorway, means mounting the elevator car for movement relative to the structure from the extension landing towards the first terminal landing to serve the landings, motive means for moving the elevator car, and control means cooperating with the motive means to move the elevator car and to stop the elevator car at predetermined landings, said control means comprising means conditioning said elevator car to operate between said terminal landings, first call means for the elevator car for registering calls for landings desired by passengers within the elevator car, second call means operable for registering a call for elevator service to be answered by movement of the elevator car to the extension landing, assigning means responsive to operation of said second call means while said elevator car is conditioned to leave the second terminal landing in the direction of the first terminal landing for assigning the elevator car to reverse for the purpose of serving the extension landing, means responsive to presence of a call registered prior to said assignment by the first call means for a landing intermediate the terminal landings for preventing said assignment of the elevator car, detector means responsive to movement of a person substantially through said doorway for operation from a first condition to a second condition, and means responsive to operation of the detector means to said second condition for temporarily rendering the assigning means ineffective to respond to the operation of the second call means.

4. In an elevator system, a structure having a plurality of landings including a first terminal landing, an extension landing and a second terminal landing intermediate the first terminal landing and the extension landing, a plurality of elevator cars each having a doorway, means mounting the elevator cars for movement relative to the structure from the extension landing towards the first terminal landing to serve the landings, motive means for moving each of the elevator cars, and control means cooperating with the motive means to move the elevator cars and to stop the elevator cars at predetermined landings, said control means comprising means conditioning said elevator cars to operate between said terminal landings, selecting means for selecting successive elevator cars to proceed from the second terminal landing towards the first terminal landing, first call means for each of the elevator cars for registering calls for landings between the terminal landings desired by passengers within the associated elevator car, second call means operable for registering a call for elevator service to be answered by movement of one of the elevator cars to the extension landing, and assigning means responsive to operation of said second call means for assigning an available one of the elevator cars located at the second terminal landing and set for travel towards the first terminal landing to reverse for the purpose of serving the extension landing, each of said elevator cars being available for such assignment under predetermined conditions, means responsive to presence of a call registered prior to said assignment by the first call means in an elevator car located at the second terminal landing and set for travel towards the first terminal landing for rendering the assignment means ineffective to reverse the last-named elevator car to serve the extension landing, detector means for each of the elevator cars, each of the detector means being responsive to movement of a person substantially through the associated doorway for operation from a first to a second condition, and means responsive to operation to the second condition of the detector means of one of the elevator cars located at the second terminal landing and set for travel towards the first terminal landing, for preventing the assignment means from assigning the last-named elevator car to reverse for the purpose of serving the extension landing for a predetermined period of time, whereby a call may be registered by the first call means for the last-named elevator car within said period of time to prevent assignment of the last-named elevator car to serve the extension landing.

5. In an elevator system, a structure having a plurality of landings including a first terminal landing, an extension landing, a second terminal landing intermediate the first terminal landing and the extension landing, a plurality of elevator cars each having a doorway, means mounting said elevator cars for movement relative to the structure from the extension landing towards the first terminal landing, motive means for moving each of the elevator cars, and control means cooperating with the motive means for moving the elevator cars and to stop the elevator cars at predetermined landings, said control means comprising means conditioning said elevator cars to serve the second terminal landing and landings displaced from the second terminal landing towards the first terminal landing, selecting means for selecting successive elevator cars to proceed from the second terminal landing towards the first terminal landing, first call means for each of the elevator cars operable for registering calls for elevator service to be answered by movement of the associated one of the elevator cars, second call means operable for registering a call for elevator service to be answered by movement of one of the elevator cars to the extension landing, assigning means responsive to operation of said second call means while one of the elevator cars is positioned at the second terminal landing and is selected by the selecting means to leave the second terminal landing for assigning the last-named elevator car to reverse for the purpose of serving the extension landing, detector means for each of the elevator cars, each of the detector means being responsive to movement of a person substantially through the associated doorway for operation from a first to a second condition, and means responsive to operation to the second condition of a detector means for one of the elevator cars selected by the selecting means for preventing the assignment means from assigning such selected elevator car to reverse for the purpose of serving the extension landing for a substantial period of time, whereby a call may be registered by the first call means of such selected elevator car within said period of time to prevent assignment of the selected elevator car to serve the extension landing.

6. In an elevator system, a structure having a plurality of landings including a first terminal landing, an extension landing and a second terminal landing intermediate the first terminal landing and the extension landing, an elevator car having a doorway, means mounting the elevator car for movement relative to the structure from the extension landing towards the first terminal landing to serve the landings, motive means for moving the elevator car, and control means cooperating with the motive means to move the elevator car and to stop the elevator car at predetermined landings, said control means comprising means conditioning said elevator car to operate between said terminal landings, first call means for the elevator car for registering calls for landings desired by passengers within the elevator car, second call means operable for registering a call for elevator service to be answered by movement of the elevator car to the extension landing, assigning means responsive to operation of said second call means while said elevator car is conditioned to leave the second terminal landing in the direction of the first terminal landing for assigning the elevator car to reverse for the purpose of serving the extension landing, means responsive to presence of a call registered prior to said assignment by the first call means for a landing intermediate the terminal landings for preventing said assignment of the elevator car, detector means responsive to movement of a person substantially through said doorway for operation from a first condition to a second condition, means responsive to operation of the detector means to said second condition for temporarily rendering the assigning means ineffective to respond to the operation of the second call means, direction signal mechanism having first and second displays to indicate respectively first and second directions in which the elevator car may leave the second terminal landing, and means operating the signal mechanism to present a display indicating the direction in which the elevator car is set to leave the second terminal landing.

7. In an elevator system, a structure having a plurality of landings including a first terminal landing, an extension landing, a second terminal landing intermediate the first terminal landing and the extension landing, a plurality of elevator cars each having a doorway, means mounting said elevator cars for movement relative to the structure from the extension landing towards the first terminal landing, motive means for moving each of the elevator cars, and control means cooperating with the motive means for moving the elevator cars and to stop the elevator cars at predetermined landings, said control means comprising means conditioning said elevator cars to serve the second terminal landing and landings displaced from the second terminal landing towards the first terminal landing, selecting means for selecting successive elevator cars to proceed from the second terminal landing towards the first terminal landing, first call means for each of the elevator cars operable for registering calls for elevator service to be answered by movement of the associated one of the elevator cars, second call means operable for registering a call for elevator service to be answered by movement of one of the elevator cars to the extension landing, assigning means responsive to operation of said second call means while one of the elevator cars is positioned at the second terminal landing and is selected by the selecting means to leave the second terminal landing for assigning the last-named elevator car to reverse for the purpose of serving the extension landing, detector means for each of the elevator cars, each of the detector means being responsive to movement of a person substantially through the associated doorway for operation from a first to a second condition, and means responsive to operation to the second condition of a detector means for one of the elevator cars selected by the selecting means for preventing the assignment means from assigning such selected elevator car to reverse for the purpose of serving the extension landing for a substantial period of time, whereby a call may be registered by the first call means of such selected elevator car within said period of time to prevent assignment of the selected elevator car to serve the extension landing, direction signal mechanism for each of the elevator cars having first and second displays to indicate respectively first and second directions in which the associated elevator car may leave the second terminal landing, and means operating the signal mechanism for the elevator car selected by the selecting means to present a display indicating the direction in which the elevator car is set to leave the second terminal landing.

8. In an elevator system, a structure having a plurality of landings including a first terminal landing, an extension landing and a second terminal landing intermediate the first terminal landing and the extension landing, an elevator car having a doorway, means mounting the elevator car for movement relative to the structure from the extension landing towards the first terminal landing to serve the landings, motive means for moving the elevator car, and control means cooperating with the motive means to move the elevator car and to stop the elevator car at predetermined landings, said control means comprising means conditioning said elevator car to operate between said terminal landings, first call means for the elevator car for registering calls for landings desired by passengers within the elevator car, second call means operable for registering a call for elevator service desired by an intending passenger at the second terminal landing to be answered by movement of the elevator car to the extension landing, assigning means responsive to operation of said second call means while the elevator car is traveling from the first terminal landing towards the second terminal landing for assigning the elevator car for a substantial time following stopping of the elevator car at the second terminal landing to assure a call for the extension landing registered by the first call means, detector means responsive to passenger movement substantially through said doorway of the elevator car for operation from a first to a second condition, and time-extending means responsive to operation of the detector means to the second condition for extending the time during which said assignment is maintained.

9. In an elevator system, a structure having a plurality of landings including a first terminal landing, an extension landing, and a second terminal landing intermediate the first terminal landing and the extension landing, an elevator car having a doorway, means mounting said elevator car for movement relative to the structure from the extension landing towards the first terminal landing, motive means for moving the elevator car, and control means cooperating with the motive means for moving the elevator car and for stopping the elevator car at selected landings, said control means comprising means conditioning said elevator car to serve the second terminal landing and landings displaced from the second terminal landing towards the first terminal landing, first call means for registering calls for the extension landing when desired by passengers within the elevator car, second call means operable for registering a call for elevator service desired by an intending passenger at the second terminal landing to be answered by movement of the elevator car to the extension landing, means controlling the moving of the elevator car and the stopping of the elevator car at each landing for which a call is registered by the call means, said elevator car being conditioned during travel from the first terminal landing towards the second terminal landing to reverse at the second terminal landing for the purpose of returning towards the first terminal landing, delay means responsive to operation of the first call means while the elevator car is set for travel from the first terminal landing towards the second terminal landing for delaying the reversal of the elevator car for a substantial time after the elevator car stops at the second terminal landing, and delay-extending means responsive to each departure of a passenger from the elevator car at the second terminal landing for delaying for a substantial time the reversal of the elevator car following said last-named stop of the elevator car, whereby time is provided following the departure of the last passenger from the elevator car to permit an intending passenger to enter the elevator car and register a call for the extension landing by operation of the first call means.

10. In an elevator system, a structure having a plurality of landings including a first terminal landing, an extension landing, and a second terminal landing intermediate the first terminal landing and the extension landing, a plurality of elevator cars, means mounting said elevator cars for movement relative to the structure from the extension landing towards the first terminal landing, motive means for moving each of the elevator cars, and control means cooperating with the motive means for moving the elevator cars and to stop the elevator cars at predetermined landings, said control means comprising means conditioning said elevator cars to reverse at the terminal landings in order to serve the second terminal landing and landings displaced from the second terminal landing towards the first terminal landing, first call means operable for registering a call by an intending passenger at the second terminal landing for elevator service to be answered by movement of one of the elevator cars towards the extension landing, second call means for each of the elevator cars operable for registering calls for landings intermediate the terminal landings and said extension landing desired by passengers within the associated elevator car, means responsive to arrival of one of the elevator cars at the second terminal landing while a call is registered by the first call means for delaying for a substantial time the reversal of such elevator car, detector means responsive to each departure of a passenger from the last-named elevator car at the second terminal landing for establishing a substantial minimum delay in reversal of such elevator car, whereby an intending passenger at the second terminal landing has a period of time after departure of the last passenger from the last-named elevator car to enter such last-named elevator car and operate the second call means for such last-named elevator car to register a call for the extension landing prior to reversal of the elevator car, each of the elevator cars while set for travel towards the extension landing being conditioned to answer a call for such extension landing registered by the associated second call means.

11. In an elevator system, a structure having a plurality of landings including a first terminal landing, an extension landing and a second terminal landing intermediate the first terminal landing and the extension landing, an elevator car having a doorway, means mounting the elevator car for movement relative to the structure from the extension landing towards the first terminal landing to serve the landings, motive means for moving the elevator car, and control means cooperating with the motive means to move the elevator car and to stop the elevator car at predetermined landings, said control means comprising means conditioning said elevator car to operate between said terminal landings, stopping time means responsive to stopping of the elevator car at at least one of the landings for initiating a starting of the elevator car following the expiration of a substantial time, call means operable for registering a call for elevator service to be answered by movement of the elevator car to the extension landing, assigning means responsive to operation of said call means while said elevator car is positioned at the second terminal landing and is conditioned to leave the second terminal landing in the direction of the first terminal landing for assigning said elevator car to reverse and proceed to the extension landing for answering the call registered by the call means, detector means responsive to movement of a person substantially through the doorway for temporary operation from a first condition to a second condition, and assignment-control means responsive to operation of the detector means to said second condition for temporarily rendering the assigning means ineffective to assign the elevator car to proceed to the extension landing, and means responsive to operation of the detector means to said second condition following the stopping of the elevator car at a landing at which said stopping-time means is effective for conditioning the stopped elevator car to start from such landing upon the expiration of a time measured from the last-named operation of the detector means which has a value materially less than said substantial time.

12. In an elevator system, a structure having a plurality of landings including a first terminal landing, an extension landing and a second terminal landing intermediate the first terminal landing and the extension landing, an elevator car having a doorway, means mounting the elevator car for movement relative to the structure from the extension landing towards the first terminal landing to serve the landings, motive means for moving the elevator car, and control means cooperating with the motive means to move the elevator car and to stop the elevator car at predetermined landings, said control means comprising means conditioning said elevator car to operate between said terminal landings, stopping time means responsive to stopping of the elevator car at at least one of the landings for initiating a starting of the elevator car following the expiration of a substantial time, first call means for the elevator car for registering calls for landings desired by passengers within the elevator car, second call means operable for registering a call for elevator service to be answered by movement of the elevator car to the extension landing, assigning means responsive to operation of said second call means while said elevator car is conditioned to leave the second terminal landing in the direction of the first terminal landing for assigning the elevator car to reverse for the purpose of serving the extension landing, means responsive to presence of a call registered prior to said assignment by the first call means for a landing intermediate the terminal landings for preventing said assignment of the elevator car, detector means responsive to movement of a person substantially through said doorway for operation from a first condition to a second condition, means responsive to operation of the detector means to said second condition for temporarily rendering the assigning means ineffective to respond to the operation of the second call means, and means responsive to operation of the detector means to said second condition following the stopping of the elevator car at a landing at which said stopping-time means is effective for conditioning the stopped elevator car to start from such landing upon the expiration of a time measured from the last-named operation of the detector means which has a value materially less than said substantial time.

13. In an elevator system, a structure having a plurality of landings including a first terminal landing, an extension landing and a second terminal landing intermediate the first terminal landing and the extension landing, a plurality of elevator cars each having a doorway, means mounting the elevator cars for movement relative to the structure from the extension landing towards the first terminal landing to serve the landings, motive means for moving each of the elevator cars, and control means cooperating with the motive means to move the elevator cars and to stop the elevator cars at predetermined landings, said control means comprising means conditioning said elevator car to operate between said terminal landings, stopping time means responsive to stopping of each of the elevator cars at at least one of the landings for initiating a starting of the elevator car following the expiration of a substantial time, selecting means for selecting successive elevator cars to proceed from the second terminal landing towards the first terminal landing, first call means for each of the elevator cars for registering calls for landings between the terminal landings desired by passengers within the associated elevator car, second call means operable for registering a call for elevator service to be answered by movement of one of the elevator cars to the extension landing, and assigning means responsive to operation of said second call means for assigning an available one of the elevator cars located at the second terminal landing and set for travel towards the first terminal landing to reverse for the purpose of serving the extension landing, each of said elevator cars being available for such assignment under predetermined conditions, means responsive to presence of a call registered prior to said assignment by the first call means in an elevator car located at the second terminal landing and set for travel towards the first terminal landing for rendering the assignment means ineffective to reverse the last-named elevator car to serve the extension landing, detector means for each of the elevator cars, each of the detector means being responsive to movement of a person substantially through the associated doorway for operation from a first to a second condition, and means responsive to operation to a second condition of the detector means of one of the elevator cars located at the second terminal landing and set for travel towards the first terminal landing, for preventing the assignment means from assigning the last-named elevator car to reverse for the purpose of serving the extension landing for a predetermined period of time, whereby a call may be registered by the first call means for the last-named elevator car within said period of time to prevent assignment of the last-named elevator car to serve the extension landing, and means responsive to operation of the detector means to said second condition following the stopping of any of the elevator cars at a landing at which said stopping-time means is effective for conditioning the stopped elevator car to start from such landing upon the expiration of a time measured from the last-named operation of the detector means which has a value materially less than said substantial time.

14. In an elevator system, a structure having a plurality of landings including a first terminal landing, an extension landing, a second terminal landing intermediate the first terminal landing and the extension landing, a plurality of elevator cars each having a doorway, means mounting said elevator cars for movement relative to the structure from the extension landing towards the first terminal landing, motive means for moving each of the elevator cars, and control means cooperating with the motive means for moving the elevator cars and to stop the elevator cars at predetermined landings, said control means comprising means conditioning said elevator cars to serve the second terminal landing and landings displaced from the second terminal landing towards the first terminal landing, stopping-time means responsive to stopping of each of the elevator cars at at least one of the landings for initiating a starting of the elevator car following the expiration of a substantial time, selecting means for selecting successive elevator cars to proceed from the second terminal landing towards the first terminal landing, first call means for each of the elevator cars operable for registering calls for elevator service to be answered by movement of the associated one of the elevator cars, second call means operable for registering a call for elevator service to be answered by movement of one of the elevator cars to the extension landing, assigning means responsive to operation of said second call means while one of the elevator cars is positioned at the second terminal landing and is selected by the selecting means to leave the second terminal landing for assigning the last-named elevator car to reverse for the purpose of serving the extension landing, detector means for each of the elevator cars, each of the detector means being responsive to movement of a person substantially through the associated doorway for operation from a first to a second condition, and means responsive to operation to the second condition of a detector means for one of the elevator cars selected by the selecting means for preventing the assignment means from assigning such selected elevator car to reverse for the purpose of serving the extension landing for a substantial period of time, whereby a call may be registered by the first call means of such selected elevator car within said period of time to prevent assignment of the selected elevator car to serve the extension landing, and means responsive to operation of the detector means to said second condition following the stopping of any of the elevator cars at a landing at which said stopping-time means is effective for conditioning the stopped elevator car to start from such landing upon the expiration of a time measured from the last-named operation of the detector means which has a value materially less than said substantial time.

15. In an elevator system, a structure having a plurality of landings including a first terminal landing, an extension landing and a second terminal landing intermediate the first terminal landing and the extension landing, an elevator car having a doorway, means mounting the elevator car for movement relative to the structure from the extension landing towards the first terminal landing to serve the landings, motive means for moving the elevator car, and control means cooperating with the motive means to move the elevator car and to stop the elevator car at predetermined landings, said control means comprising means conditioning said elevator car to operate between said terminal landings, stopping-time means responsive to stopping of the elevator car at at least one of the landings for initiating a starting of the elevator car following the expiration of a substantial time, first call means for the elevator car for registering calls for landings desired by passengers within the elevator car, second call means operable for registering a call for elevator service to be answered by movement of the elevator car to the extension landing, assigning means responsive to operation of said second call means while said elevator car is conditioned to leave the second terminal landing in the direction of the first terminal landing for assigning the elevator car to reverse for the purpose of serving the extension landing, means responsive to presence of a call registered prior to said assignment by the first call means for a landing intermediate the terminal landings for preventing said assignment of the elevator car, detector means responsive to movement of a person substantially through said doorway for operation from a first condition to a second condition, means responsive to operation of the detector means to said second condition for temporarily rendering the assigning means ineffective to respond to the operation of the second call means, direction signal mechanism having first and second displays to indicate respectively first and second directions in which the elevator car may leave the second terminal landing, and means operating the signal mechanism to present a display indicating the direction in which the elevator car is set to leave the second terminal landing, and means responsive to operation of the detector means to said second condition following the stopping of the elevator car at a landing at which said stopping-time means is effective for conditioning the stopped elevator car to start from such landing upon the expiration of a time measured from the last-named operation of the detector means which has a value materially less than said substantial time.

16. In an elevator system, a structure having a plurality of landings including a first terminal landing, an extension landing, a second terminal landing intermediate the first terminal landing and the extension landing, a plurality of elevator cars each having a doorway, means mounting said elevator cars for movement relative to the structure from the extension landing towards the first terminal landing, motive means for moving each of the elevator cars, and control means cooperating with the motive means for moving the elevator cars and to stop the elevator cars at predetermined landings, said control means comprising means conditioning said elevator cars to serve the second terminal landing and landings displaced from the second terminal landing towards the first terminal landing, stopping-time means responsive to stopping of the elevator car at at least one of the landings for initiating a starting of the elevator car following the expiration of a substantial time, selecting means for selecting successive elevator cars to proceed from the second terminal landing towards the first terminal landing, first call means for each of the elevator cars operable for registering calls for elevator service to be answered by movement of the associated one of the elevator cars, second call means operable for registering a call for elevator service to be answered by movement of one of the elevator cars to the extension landing, assigning means responsive to operation of said second call means while one of the elevator cars is positioned at the second terminal landing and is selected by the selecting means to leave the second terminal landing for assigning the last-named elevator car to reverse for the purpose of serving the extension landing for a substantial period of time, whereby a call may be registered by the first call means of such selected elevator car within said period of time to prevent assignment of the selected elevator car to serve the extension landing, direction signal mechanism for each of the elevator cars having first and second displays to indicate respectively first and second directions in which the associated elevator car may leave the second terminal landing, means operating the signal mechanism for the elevator car selected by the selecting means to present a display indicating the direction in which the elevator car is set to leave the second terminal landing, and means responsive to operation of the detector means to said second condition following the stopping of the elevator car at a landing at which said stopping-time means is effective for conditioning the stopped elevator car to start from such landing upon the expiration of a time measured from the last-named operation of the detector means which has a value materially less than said substantial time.

17. In an elevator system, a structure having a plurality of landings including a first terminal landing, an extension landing and a second terminal landing intermediate the first terminal landing and the extension landing, an elevator car having a doorway, means mounting the elevator car for movement relative to the structure from the extension landing towards the first terminal landing to serve the landings, motive means for moving the elevator car, and control means cooperating with the motive means to move the elevator car and to stop the elevator car at predetermined landings, said control means comprising means conditioning said elevator car to operate between said terminal landings, stopping-time means responsive to stopping of the elevator car at at least one of the landings for initiating a starting of the elevator car following the expiration of a substantial time, first call means for the elevator car for registering calls for landings desired by passengers within the elevator car, second call means operable for registering a call for elevator service desired by an intending passenger at the second terminal landing to be answered by movement of the elevator car to the extension landing, assigning means responsive to operation of said second call means while the elevator car is traveling from the first terminal landing towards the second terminal landing for assigning the elevator car for a substantial time following stopping of the elevator car at the second terminal landing to assure a call for the extension landing registered by the first call means, detector means responsive to passenger movement substantially through said doorway of the elevator car for operation from a first to a second condition, time-extending means responsive to operation of the detector means to the second condition for extending the time during which said assignment is maintained, and means responsive to operation of the detector means to said second condition following the stopping of the elevator car at a landing at which said stopping-time means is effective for conditioning the stopped elevator car to start from such landing upon the expiration of a time measured from the last-named operation of the detector means which has a value materially less than said substantial time.

18. In an elevator system, a structure having a plurality of landings including a first terminal landing, an extension landing and a second terminal landing intermediate the first terminal landing and the extension landing, an elevator car having a doorway, means mounting the elevator car for movement relative to the structure from the extension landing towards the first terminal landing to serve the landings, motive means for moving the elevator car, and control means cooperating with the motive means to move the elevator car and to stop the elevator car at predetermined landings, said control means comprising means conditioning said elevator car to operate between said terminal landings, first call means for the elevator car for registering calls for landings desired by passengers within the elevator car, second call means operable for registering a call for elevator service desired by an intending passenger at the second terminal landing to be answered by movement of the elevator car to the extension landing, assigning means responsive to operation of said second call means while the elevator car is traveling from the first terminal landing towards the second terminal landing for assigning the elevator car for a substantial time following stopping of the elevator car at the second terminal landing to answer a call for the extension landing registered by the first call means, detector means responsive to passenger movement substantially through said doorway of the elevator car for operation from a first to a second condition, and time-extending means responsive to operation of the detector means to the second condition for extending the time during which said assignment is maintained, said assignment means including reverse-control means effective in response to effective registration of an extension landing call by the first call means while the elevator car is positioned at the second terminal landing set for travel towards the first terminal landing for reversing the elevator car to make the next movement of the car towards the extension landing, means responsive to registration of a call by the first call means for a landing intermediate the terminal landings while the elevator car is positioned at the second terminal landing set for travel towards the first terminal landing prior to effective registration of an extension landing call by said first call means for rendering the reverse-control means ineffective for reversing the elevator car in response to registration of a call for the extension landing by the first call means while the elevator car remains at the second terminal landing, and means responsive to operation of the detector means to said second condition for rendering the first call means incapable of registering an effective call for the extension landing for a substantial time, whereby a person entering the elevator car at the second terminal landing prior to registration of an extension landing call by the call means and while the elevator car is set for travel towards the first terminal landing has a substantial time within which to register a call capable of maintaining the elevator car direction.

19. In an elevator system, a structure having a plurality of landings including a first terminal landing, an extension landing and a second terminal landing intermediate the first terminal landing and the extension landing, an elevator car having a doorway, means mounting the elevator car for movement relative to the structure from the extension landing towards the first terminal landing to serve the landings, motive means for moving the elevator car, and control means cooperating with the motive means to move the elevator car and to stop the elevator car at predetermined landings, said control means comprising means conditioning said elevator car to operate between said terminal landings, stopping-time means responsive to stopping of the elevator car at at least one of the landings for initiating a starting of the elevator car following the expiration of a substantial time, first call means for the elevator car for registering calls for landings desired by passengers within the elevator car, second call means operable for registering a call for elevator service desired by an intending passenger at the second terminal landing to be answered by movement of the elevator car to the extension landing, assigning means responsive to operation of said second call means while the elevator car is traveling from the first terminal landing towards the second terminal landing for assigning the elevator car for a substantial time following stopping of the elevator car at the second terminal landing to answer a call for the extension landing registered by the first call means, detector means responsive to passenger movement substantially through said doorway of the elevator car for operation from a first to a second condition, and time-extending means responsive to operation of the detector means to the second condition for extending the time during which said assignment is maintained, means responsive to operation of the detector means to said second condition following the stopping of the elevator car at a landing at which said stopping-time means is effective for conditioning the stopped elevator car to start from such landing upon the expiration of a time measured from the last-named operation of the detector means which has a value materially less than said substantial time, said assignment means including reverse-control means effective in response to effective registration of an extension landing call by the first call means while the elevator car is positioned at the second terminal landing set for travel towards the first terminal landing for reversing the elevator car to make the next movement of the car towards the extension landing, means responsive to registration of a call by the first call means for a landing intermediate the terminal landings while the elevator car is positioned at the second terminal landing set for travel towards the first terminal landing prior to effective registration of an extension landing call by said first call means for rendering the reverse-control means ineffective for reversing the elevator car in response to registration of a call for the extension landing by the first call means while the elevator car remains at the second terminal landing, and means responsive to operation of the detector means to said second condition for rendering the first call means incapable of registering an effective call for the extension landing for a substantial time, whereby a person entering the elevator car at the second terminal landing prior to registration of an extension landing call by the call means and while the elevator car is set for travel towards the first terminal landing has a substantial time within which to register a call capable of maintaining the elevator car direction.

20. In an elevator system, a structure having a plurality of landings including a first terminal landing, an extension landing, and a second terminal landing intermediate the first terminal landing and the extension landing, a plurality of elevator cars each having a doorway, means mounting said elevator cars for movement relative to the structure from the extension landing towards the first terminal landing, motive means for moving each of the elevator cars, and control means cooperating with the motive means for moving the elevator cars and to stop the elevator cars at predetermined landings, said control means comprising means responsive to the stopping of any of the elevator cars at a landing other than the terminal landings for initiating the starting of the stopping elevator car a substantial time after the stopping of such elevator car, means conditioning said elevator cars to reverse at the terminal landings in order to serve the second terminal landing and landings displaced from the second terminal landing towards the first terminal landing, first call means operable for registering a call by an intending passenger at the second terminal landing for elevator service to be answered by movement of one of the elevator cars towards the extension landing, second call means for each of the elevator cars operable for registering calls for landings intermediate the terminal landings and said extension desired by passengers within the associated elevator car, means responsive to arrival of one of the elevator cars at the second terminal landing while a call is registered by the first call means for delaying for a substantial time the reversal of such elevator car, means responsive to registration of an effective extension landing call by the second call means of any of the cars positioned at the second terminal landing and set for travel towards the first terminal landing for reversing such elevator car to serve the extension landing provided that no call for a landing intermediate the terminal landings is registered by the second call means of such elevator car at the time of registration of such effective extension landing call, signal means for each of the elevator cars, each of the signal means being effective for signalling to intending passengers at the second terminal landing the direction in which the associated elevator car will next leave the terminal landing, detector means for each of the elevator cars responsive to each movement of a person substantially through the doorway of the associated elevator car for temporary operation from a first to a second condition, means responsive to operation to the second condition of the detector means for one of the elevator cars stopping at the second terminal floor while set for travel towards the extension landing and while a call for said extension landing is registered by the first call means for establishing a substantial delay in reversal of the elevator car, whereby an intending passenger at the second terminal landing has a period of time after departure of the last passenger from the last-named elevator car to enter such last-named elevator car and operate the second call means for the last-named elevator car prior to reversal of the last-named elevator car, each of the elevator cars while set for travel towards the extension landing being conditioned to answer a call for such extension landing registered by the associated second call means, means responsive to operation of the detector means to the second condition while the associated elevator car is at the second terminal landing set for travel towards the first terminal landing for temporarily rendering the second call means for the associated elevator car incapable of registering an effective extension landing call, whereby a person entering the last-named elevator car may first register an effective call for a landing intermediate the terminal landings by the second call means, and means responsive to operation of the detector means to the second condition while one of the elevator cars is stopped at a landing at which the substantial time is effective for initiating the starting of the last-named elevator car after the lapse of a time measured from the last-named operation of the detector means which has a value materially less than said substantial time.

No references cited.